US012446035B2

(12) United States Patent
Vankayala et al.

(10) Patent No.: US 12,446,035 B2
(45) Date of Patent: Oct. 14, 2025

(54) SYSTEM AND METHOD TO REDUCE PDCCH BLIND DECODING ATTEMPTS USING ARTIFICIAL INTELLIGENCE AND MACHINE LEARNING

(71) Applicant: SAMSUNG ELECTRONICS CO., LTD., Suwon-si (KR)

(72) Inventors: Satya Kumar Vankayala, Andhra Pradesh (IN); Venkateswarlu Yarramala, Andhra Pradesh (IN); Seungil Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 403 days.

(21) Appl. No.: 17/896,659

(22) Filed: Aug. 26, 2022

(65) Prior Publication Data

US 2022/0417971 A1 Dec. 29, 2022

Related U.S. Application Data

(63) Continuation of application No. PCT/KR2021/004801, filed on Apr. 16, 2021.

(30) Foreign Application Priority Data

Apr. 16, 2020 (IN) .............................. 202041016426
Dec. 16, 2020 (IN) .............................. 202041016426

(51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0061* (2013.01); *H04L 1/1812* (2013.01); *H04W 72/23* (2023.01)

(58) Field of Classification Search
CPC .............. H04W 72/1273; H04W 72/23; H04L 1/0061; H04L 1/1812; H04L 5/0053
See application file for complete search history.

(56) References Cited

U.S. PATENT DOCUMENTS

2012/0039179 A1 2/2012 Seo et al.
2012/0294271 A1 11/2012 Matsumoto
(Continued)

FOREIGN PATENT DOCUMENTS

EP 2 434 820 3/2012
EP 3 255 826 12/2017
(Continued)

OTHER PUBLICATIONS

International Search Report for PCT/KR2021/004801, dated Jul. 22, 2021, 5 pages.
(Continued)

*Primary Examiner* — Chandrahas B Patel
(74) *Attorney, Agent, or Firm* — NIXON & VANDERHYE P.C.

(57) ABSTRACT

Provided is a method of operating a user equipment (UE) in a wireless network for managing physical downlink control channel (PDCCH) data. The method includes: obtaining a plurality of network parameters, predicting at least one aggregation level (AL) used by a base station (BS) associated with the UE to transmit the PDCCH data in the wireless network based on the plurality of received network parameters, and decoding the PDCCH data based on the at least one predicted AL.

15 Claims, 16 Drawing Sheets

(51) Int. Cl.
*H04L 1/1812* (2023.01)
*H04W 72/23* (2023.01)

(56) References Cited

U.S. PATENT DOCUMENTS

| | | |
|---|---|---|
| 2017/0150484 A1 | 5/2017 | Zhu et al. |
| 2018/0035411 A1* | 2/2018 | Wang .................... H04W 72/23 |
| 2018/0176059 A1 | 6/2018 | Medles et al. |
| 2018/0324765 A1 | 11/2018 | Nammi et al. |
| 2019/0166589 A1 | 5/2019 | Yang et al. |
| 2020/0008180 A1* | 1/2020 | Jo ......................... H04L 5/0053 |
| 2021/0185515 A1* | 6/2021 | Bao ....................... H04W 72/51 |
| 2022/0029892 A1* | 1/2022 | Hooli .................... H04W 24/02 |
| 2023/0096196 A1* | 3/2023 | Kim ....................... H04B 7/088 370/329 |

FOREIGN PATENT DOCUMENTS

| | | |
|---|---|---|
| WO | WO2013155832 A1 | 10/2013 |
| WO | 2018063201 A1 | 4/2018 |
| WO | 2021/080222 | 4/2021 |

OTHER PUBLICATIONS

Written Opinion of the ISA for PCT/KR2021/004801, dated Jul. 22, 2021, 4 pages.
Extended European Search Report dated Aug. 11, 2023 issued in European Patent Application No. 21787572.3.
Zhang et al., "Optimization of PDCCH blind detection method in LTE-A system", SAMSE, 2018, 6 pages.
India Office Action dated Feb. 22, 2022 for India Application No. 202041016426.
European Office Action dated May 15, 2025 issued in European Patent Application No. 21787572.3, 6 pp.

* cited by examiner

SYSTEM AND METHOD TO REDUCE PDCCH BLIND DECODING ATTEMPTS USING ARTIFICIAL INTELLIGENCE AND MACHINE LEARNING

CROSS-REFERENCE TO RELATED APPLICATIONS

This application is a continuation of International Application No. PCT/KR2021/004801 designating the United States, filed on Apr. 16, 2021, in the Korean Intellectual Property Receiving Office and claiming priority to Indian Provisional Patent Application No. 202041016426, filed on Apr. 16, 2020, in the Indian Patent Office, and to Indian Complete Patent Application No. 202041016426, filed on Dec. 16, 2020, in the Indian Patent Office, the disclosures of all of which are incorporated by reference herein in their entireties.

BACKGROUND

Field

The disclosure relates to physical downlink channel (PDCCH) decoding, and for example, is related to a method and a system for reducing decoding attempts for PDCCH decoding in a communication network system using machine learning.

Description of Related Art

Downlink control channel is an important component of Long-Term Evolution (LTE) system, wherein physical downlink control channel (PDCCH) carries downlink control information (DCI) schedule information of transmitting uplink data, schedule information of a transmitting downlink data, DCI for BWP switching, and uplink power control information. The PDCCH is transmitted in each subframe in the system band. A plurality of user equipment's (UEs) may be simultaneously scheduled in the downlink and the uplink and thus, multiple PDCCHs are simultaneously transmitted in each cell. In current 4G systems, the UE blindly decodes the PDCCH channel which carries the DCI or uplink control information (UCI) in every transmission time interval (TTI) to find out whether there are any uplink/downlink (UL/DL) transmissions. This consumes significant UE battery power to blindly decode PDCCH in every TTI. In the current 5G systems, the UE blindly decodes PDCCH Channel which carries the DCIs in the configured control resource set (CORSET) across all configured search space sets in active bandwidth part (BWP) with all possible control channel elements (CCEs) and aggregation levels (ALs) in every slot. This consumes significant UE battery power to blindly decode PDCCH in every slot.

Therefore, the blind decoding of PDCCH indicates an exhaustive operation in which the UE performs the blind decoding of the PDCCH with respect to all possible downlink control channel formats and all possible combinations of time/frequency resources in a given search space. The downlink control channel may be transmitted at time intervals in which data scheduling and transmission is performed (e.g., a subframe interval, a slot interval, a mini-slot interval, etc.), and the UE may need to perform blind decoding. For example, for a PDCCH of an LTE system, the UE may perform blind decoding of a downlink control channel a maximum times for each component carrier. However, from the perspective of power, time and resource consumption of the UE, this is a big burden.

In view of the above, there is a need of a system or method to reduce number of decoding attempts need to be performed by the UE to receive uplink/downlink related information from the base station.

SUMMARY

According to an example embodiment of the disclosure, a method of operating a user equipment (UE) in a wireless network for managing physical downlink control channel (PDCCH) data is provided. The method includes: obtaining a plurality of network parameters, predicting at least one aggregation level (AL) used by a base station (BS) associated with the UE to transmit the PDCCH data in the wireless network based on the plurality of received network parameters, and decoding the PDCCH data based on the at least one predicted AL.

BRIEF DESCRIPTION OF THE DRAWINGS

The method and system are illustrated in the accompanying drawings, throughout which like reference letters indicate corresponding parts in the various figures. Further, the above and other aspects, features and advantages of certain embodiments will be more apparent from the following detailed description, taken in conjunction with the accompanying drawings, in which.

DETAILED DESCRIPTION

Figure 1:
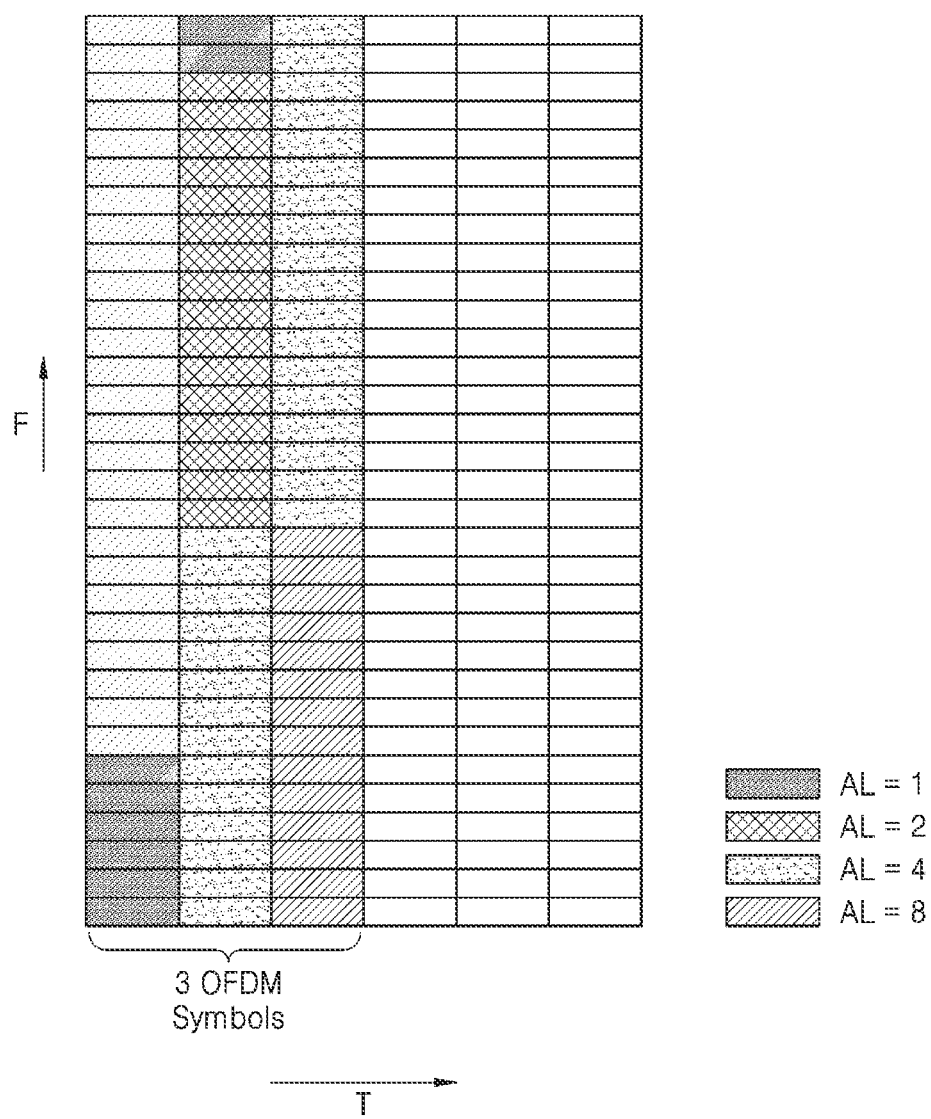
FIG. 1 is a diagram illustrating an example of a number of orthogonal frequency-division multiplexing (OFDM) symbols used for carrying control data from a BS to a UE in a wireless network system.

In accordance with various example embodiments of the disclosure, there is provided a method for managing PDCCH data by a UE in a wireless network. The method includes receiving, by the UE, a plurality of network parameters. The method includes predicting, by the UE, aggregation level (AL) used by a base station (BS) associated with the UE to transmit the PDCCH data in the wireless network and/or a search space set to be monitored for the PDCCH data based on the plurality of network parameters. The method includes decoding, by the UE, the PDCCH data based on the predicted AL and/or the predicted search space set.

In accordance with an example embodiment of the disclosure, the prediction, by the UE, of the predicted AL and/or the predicted search space set based on the plurality of network parameters includes providing the plurality of network parameters as input to a trained ML model, and applying the trained ML model on each of the inputted network parameters to obtain the predicted AL and/or the predicted search space set.

In accordance with an example embodiment of the disclosure, the ML model includes a neural network (NN) and the NN is trained by providing the plurality of network parameters from different BSs to a plurality of input nodes of the NN, determining an optimal weight of each NN node in the NN for each BS based on a back-propagation, where the optimal weight is a weight corresponding to which an error function of the NN network is less than a threshold value, and training the NN based on the optimal weight for each NN node and the plurality of network parameters.

In accordance with an example embodiment of the disclosure, sub-set of parameters are used to train the ML/AI model. The ML/AI model are used for managing PDCCH data in an improved manner. The disclosed method can continuously improve the managing PDCCH data using reinforcement learning. These kind of learning can be done either offline or online.

In accordance with an example embodiment of the disclosure, the plurality of network parameters comprises: current channel conditions, a downlink hybrid automatic repeat request (H-ARQ) feedback, an uplink H-ARQ feedback, a downlink control information (DCI) grant size, a frequency range used by the BS, a numerology used by the BS, a numerology used by the UE, an active bandwidth part (BWP) configured by the BS for the UE, a passive BWP configured by the BS for the UE, a control resource set (CORESET) information, a search space set information, measurements of the UE on different frequencies, a reference signal received power (RSRP), a reference signal received quality (RSRQ), a received signal strength indicator (RSSI), a beam index, a neighbouring BS frequency reuse factors, BS capability, UE capability, infinite impulse response (IIR) filtered information or correlation exploitation, aggregation levels in previous TTI, search space set information, an operating frequency of the UE, a BS transmission type, a function of BS transmission mode for the UE, a time division duplexing (TDD) information, a frequency division duplexing (FDD) information, a dynamic TDD information, a BS transmit power, a BS Index, a channel estimation of the UE on different UL channels and DL channels, a Doppler frequency, mobility information of the UE, a speed and a velocity of the UE with respect to the BS.

In accordance with an example embodiment of the disclosure, the current channel conditions comprise: the RSSI, a signal inference noise ratio (SINR), a channel co-efficient matrix "H", a channel quality indicator (CQI), a rank index (RI), a pre-coding matrix index (PMI), the RSRP, and a number of antenna ports.

In accordance with an example embodiment of the disclosure, the plurality of network parameters further comprises: a present time, an identifier of the BS, a frequency of operation of the BS, a location information of the UE, a location information of the BS, a density of traffic associated with the BS, a distribution of traffic associated with the BS, a category of the BS, climate conditions, information of special occasions on the present day associated with area of the UE, an event based calendar of the UE, a vacation details of a user associated with the UE, a category of the UE, a subscription details of the UE, and a capability of the UE.

In accordance with an example embodiment of the disclosure, the decoding, by the UE, of the PDCCH data based on the predicted AL includes: selecting, by the UE, an AL from the predicted AL, searching, by the UE, for the PDCCH data on CCE index by unmasking a radio network identifier (RNTI) value for the selected AL, storing, by the UE, PDCCH bits in a PDCCH buffer to determine a PDCCH format and a DCI format, and detecting, by the UE, the PDCCH data based on the PDCCH format and the DCI format.

In accordance with an example embodiment of the disclosure, the decoding, by the UE, of the PDCCH data based on the predicted search space set includes: selecting, by the UE, a search space set from the predicted search space set to be monitored, searching, by the UE, for the PDCCH data on CCE index by unmasking a radio network identifier (RNTI) value for the selected search space set, storing, by the UE, PDCCH bits in a PDCCH buffer to determine a DCI format, and detecting, by the UE, the PDCCH data based on the DCI format.

In accordance with an example embodiment of the disclosure, the method includes: receiving, by the UE, a decoding feedback using the predicted AL and/or the predicted search space set, and updating, by the UE, the ML model based on the decoding feedback.

In accordance with an example embodiment of the disclosure, the PDCCH data is decoded using a greedy mechanism, wherein the greedy mechanism starts the PDCCH decoding with a higher aggregation level and moves towards a lower aggregation level, and the UE stops the greedy mechanism upon finding DCI payloads at a specified aggregation level with expected DCI sizes and does not proceed with searching DCI in remaining aggregation levels.

In accordance with an example embodiment of the disclosure, the PDCCH data is decoded using a Markov chain model based on at least one of a past aggregation level and a decoding state of the PDCCH data.

In accordance with an example embodiment of the disclosure, the Greedy mechanism further chooses a starting aggregation level based on a channel conditions (e.g., RSSI, SINR, CQI, RI, PMI, RSRP, number of antenna ports, HARQ feedback and other parameters). This will further reduce UE power consumption as compared to Greedy mechanism which improves UE battery life. Further, the disclosed Greedy mechanism is also generalized to select appropriate search space sets to be monitored based on the channel conditions and other parameters for 5G system using AI and ML. This will further reduce UE power consumption as compared to existing and greedy algorithm.

In accordance with an example embodiment of the disclosure, there is provided a method for managing PDCCH data by a BS in a wireless communication network. The method includes receiving, by the BS, a plurality of network parameters. The method includes predicting, by the BS, an AL to be used for transmission of the PDCCH data to a UE in the wireless network and/or a search space set to be used for the transmission of the PDCCH data to the UE, based on the plurality of network parameters. The method includes encoding, by the BS, the PDCCH data based on the predicted AL and/or the predicted search space set, and transmitting, by the BS, the encoded PDCCH data to the UE.

In accordance with an example embodiment of the disclosure, there is provided a UE for managing PDCCH data in a wireless network. The UE includes: a memory, a processor, and a PDCCH decoding controller, communicatively connected to the memory and the processor. The PDCCH decoding controller is configured to receive a plurality of network parameters and predict an AL used by a BS associated with the UE to transmit the PDCCH data in the wireless network and/or a search space set to be monitored for the PDCCH data based on the plurality of network parameters. The PDCCH decoding controller is further configured to decode the PDCCH data based on the predicted AL and/or the predicted search space set.

In accordance with an example embodiment of the disclosure, there is provided a base station (BS) for managing PDCCH data in a wireless network. The BS includes a memory, a processor, and a PDCCH encoding controller, communicatively connected to the memory and the processor. The PDCCH decoding controller is configured to receive a plurality of network parameters. The PDCCH decoding controller is further configured to predict an AL to be used for transmission of the PDCCH data to a UE in the wireless network and/or a search space set to be used for the transmission of the PDCCH data to the UE based on the plurality of network parameters. The PDCCH decoding controller is further configured to encode the PDDCH data based on the predicted AL and/or the predicted search space set and transmit the encoded PDCCH data to the UE.

In accordance with an example embodiment of the disclosure, there is provided a method of operating a user equipment (UE) in a wireless network for managing physical downlink control channel (PDCCH) data. The method includes: obtaining a plurality of network parameters, predicting at least one aggregation level (AL) used by a base station (BS) associated with the UE to transmit the PDCCH data in the wireless network based on the plurality of received network parameters, and decoding the PDCCH data based on the at least one predicted AL.

In accordance with an example embodiment of the disclosure, there is provided a method of operating a base station (BS) in a wireless communication network for managing physical downlink control channel (PDCCH) data. The method includes: obtaining a plurality of network parameters, predicting an aggregation level (AL) to be used for transmission of the PDCCH data to a user equipment (UE) in the wireless network based on the plurality of received network parameters, encoding the PDCCH data based on the at least one predicted AL, and transmitting the encoded PDCCH data to the UE.

In accordance with an example embodiment of the disclosure, there is provided a user equipment (UE) for managing physical downlink control channel (PDCCH) data in a wireless network. The UE includes: a memory, a processor, and a PDCCH decoding controller, communicatively connected to the memory and the processor configured to: obtain a plurality of network parameters, predict an aggregation level (AL) used by a base station (BS) associated with the UE to transmit the PDCCH data in the wireless network, and decode the PDCCH data based on the at least one predicted AL.

In accordance with an example embodiment of the disclosure, there is provided a base station (BS) for managing physical downlink control channel (PDCCH) data in a wireless network. The BS includes: a memory, a processor, and a PDCCH encoding controller communicatively connected to the memory and the processor configured to: obtain a plurality of network parameters, predict an aggregation level (AL) to be used for transmission of the PDCCH data to a user equipment (UE) in the wireless network, based on the plurality of received network parameters, encode the PDDCH data based on the at least one predicted AL, and transmit the encoded PDCCH data to the UE.

These and other aspects of the various example embodiments disclosed herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the embodiments herein without departing from the spirit thereof, and the embodiments herein include all such modifications.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein.

Accordingly, the examples should not be construed as limiting the scope of the embodiments herein.

Various embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to help understand various technical features and it should be understood that the various example embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The term "couple" and its derivatives may refer, for example, to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, refer, for example, to inclusion without limitation. The term "or" is inclusive, meaning and/or. The phrase "associated with," as well as derivatives thereof, may refer, for example, to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" may refer, for example, to any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, may refer, for example, to different combinations of one or more of the listed items being used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium may not include wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases may be provided throughout the disclosure. Those of ordinary skill in the art should understand that in many if not most instances, such definitions apply to prior as well as future uses of such defined words and phrases.

The training of NN/ML/AI module can be done on per UE or per Beam or per BWP or per frequency Band.

Example embodiments herein provide a method and a system for managing physical downlink control channel (PDCCH) data by a UE in a wireless network. The method may be used for enabling the UE to intelligently decode the PDCCH data based on predicting one or more aggregation levels (ALs) used by a BS associated with the UE to transmit the PDCCH data in the wireless network, based on a plurality of network parameters.

Example embodiments provide a method for predicting an order of AL decoding along with the search space set for a 5G system and stopping the AL decoding upon successfully decoding it.

Accordingly, various example embodiments herein achieve a method for managing PDCCH data by a UE in a wireless network. The method includes obtaining, by the UE, a plurality of network parameters. The method includes predicting, by the UE, an AL used by a BS associated with the UE to transmit the PDCCH data in the wireless network, based on the plurality of network parameters. The method includes decoding, by the UE, the PDCCH data based on the predicted AL. The method may include predicting, by the UE, a search space set to be monitored for the PDCCH data based on the plurality of network parameters, and decoding, by the UE, the PDCCH data based on the predicted search space set.

In the existing method, the UE does not know the CCEs allocated by the BS to carry the PDCCH data which contains the DCI. The DCI carries DL or UL control information required for the UE to perform uplink and downlink transmissions. Also, the UE does not know the AL used by the BS to transmit the PDCCH data. Therefore, in the 4G wireless network systems, the UE blindly decodes the PDCCH data with all possible CCEs and all possible ALs. In the 5G wireless network systems the UE blindly decodes the PDCCH data with all possible ALs across all search space sets. Thus, the UE has to spend significant amount of time and resources to process a blind decoding of the PDCCH data with each aggregation level (AL) or each search space set, leading to unnecessary power consumption.

Unlike conventional methods and systems, the disclosed method may be used to intelligently predict an aggregation level and/or a search space set which has high chances of leading to the desired DCI for the UE. The disclosed method may use one or more trained ML models (such as neural networks (NN) or Reinforcement learning (RL) model) to predict the AL used by a BS associated with the UE to transmit the PDCCH data in the wireless network and/or the search space set to be monitored for the PDCCH data, based on the plurality of network parameters. Therefore, the disclosed method eliminates/reduces the need of performing blind decoding across all the ALs and/or search space sets to get the DCI, and hence the power consumption of the UE is significantly reduced.

In the disclosed methods, the BS also intelligently encodes the PDCCH data using the one or more trained ML models. Based on the past statistics of ACK/NACKs and/or channel conditions, the BS will predict the appropriate AL using ML. The provided diagrams are for illustration purposes only and instead of DNN, the system may also come-up with new CNN or new RNN. Further, the system may also use sparse DNN, CNN, and RNN as well. Further, the system may also use various activation functions, approximation of activation functions, and/or linear approximation of activation functions. Further, the system may also intelligently remove the connections in the NN network if the weight of the link is negligible and again the system may retrain the NN to achieve the expected performance. For example, if performance does not meet the requirement, the system will go back earlier NN. Further, the system may use ML/AI to improve the performance of these algorithms. The person with ordinary skill in the area may easily realize modifications to the disclosed solutions. These techniques may run in ML module or may run in hardware (HW). It may also use HASH or lookup table kind of mechanisms. These may be created by BS and will be informed to UE, or UE may itself create these tables.

Referring now to the drawings, and more particularly to FIGS. 5-15, where similar reference characters denote corresponding features consistently throughout the figures, there are shown various example embodiments.

FIG. 1 is a diagram illustrating an example of a number of orthogonal frequency-division multiplexing (OFDM) symbols used for carrying control data from the BS to the UE in the wireless network system.

The PDCCH data is mapped to first n number of OFDM symbols. The first n number of OFDM symbols for the PDCCH may be 1, 2, or 3. The number of symbols used for PDCCH are specified by physical control format indicator channel (PCFICH). As shown in FIG. 1, total 3 OFDM symbols are used for PDCCH data. The PDCCH data carries the resource assignment for the UE which are contained in the DCI message. Multiple PDCCHs may be transmitted in same subframe using control channel elements (CCE) each of which is a nine set of four resource elements (RE) known as resource element groups (REG) in the 4G wireless network system. In the 5G wireless system, each CCE is six REGs, each of which is a set of twelve REs. The number of CCEs used for the transmission of the PDCCH data defines an aggregation level (AL) used for the PDCCH data. The AL may be 1, 2, 4, or 8 in the 4G wireless systems and the AL may be 1, 2, 4, 8, or 16 in the 5G wireless systems. The value from among 1, 2, 4, and 8 with/without 16 may be used for the PDCCH data transmission to the UE depending on channel conditions to ensure sufficient robustness. In the future systems (e.g., 6G wireless systems or the like), higher order ALs (e.g., 32) may also be considered. Further, the UE may also be associated multiple search spaces simultaneously, the disclosed method may be used for managing the PDCCH data.

Figure 2:
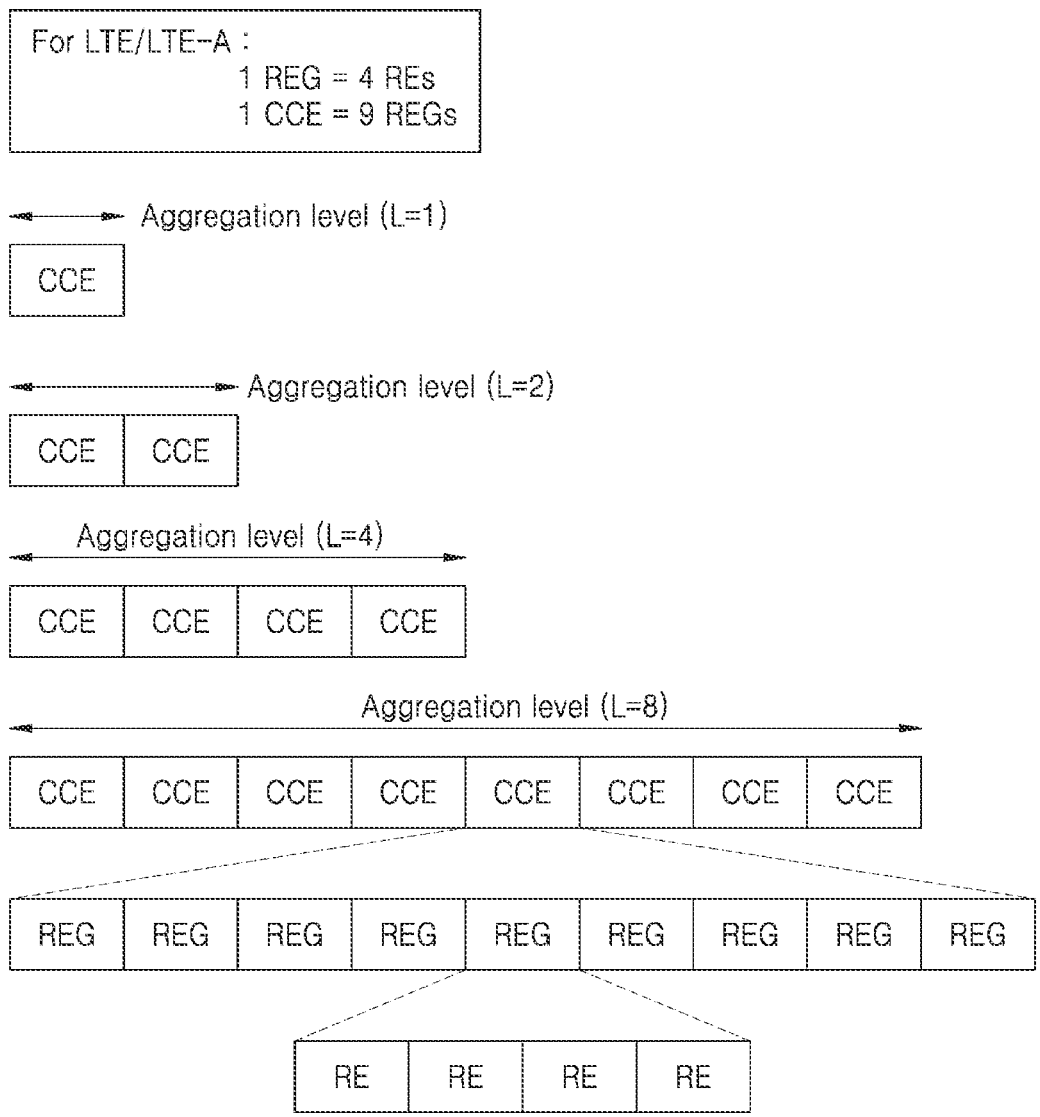
FIG. 2 is a diagram illustrating an example structure of a CCE and allocation of CCE based on AL in a 4G wireless network system.
Figure 3:
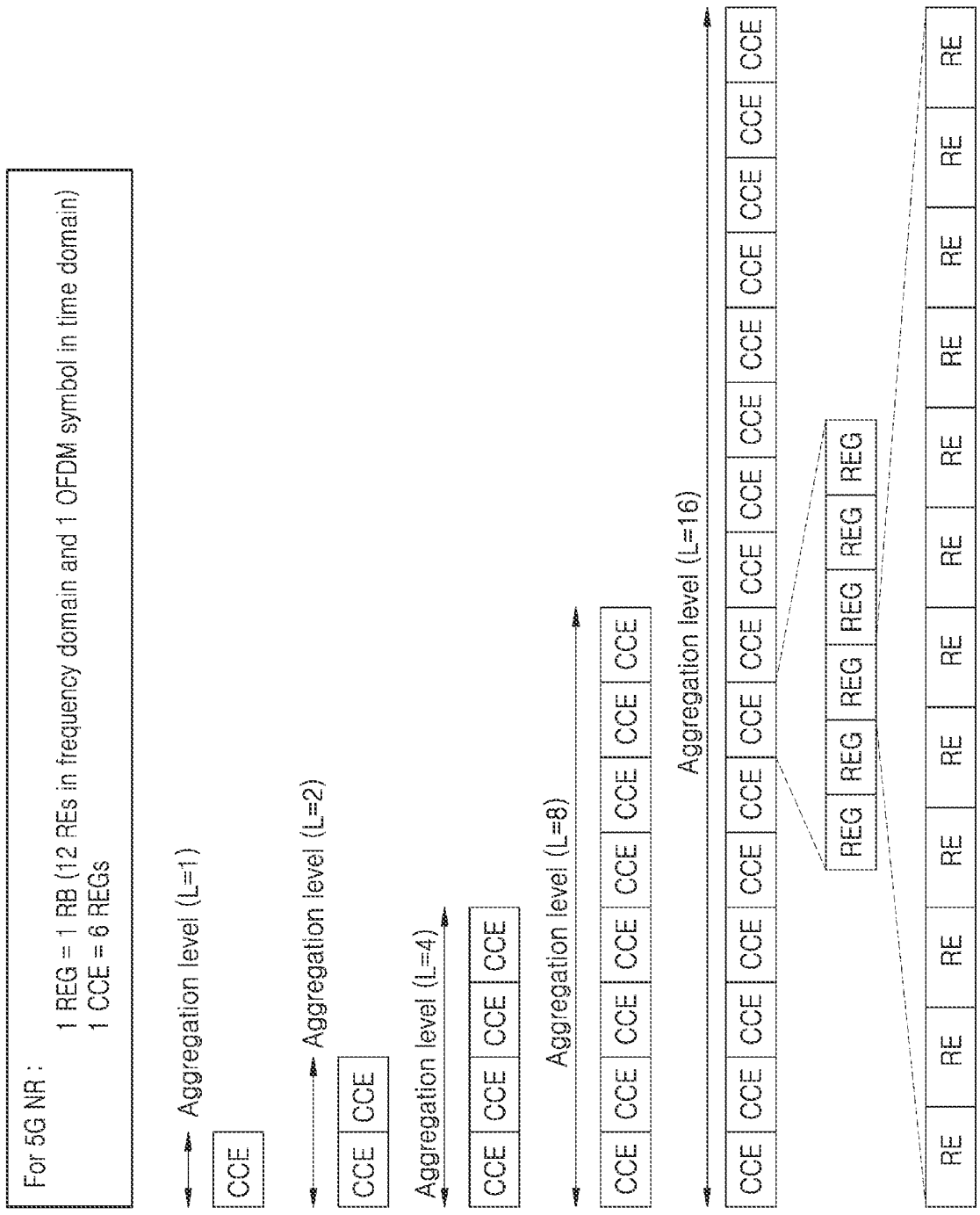
FIG. 3 is a diagram illustrating an example structure of a CCE and allocation of CCE based on AL in a 5G wireless network system.

The structure and allocation of the CCEs in the 4G wireless system is illustrated in FIG. 2 and the structure and allocation of the CCEs in the 5G wireless system is illustrated in FIG. 3.

Further, as the UE is not explicitly informed of the detailed control channel structure, the UE attempts blindly decoding the control region. Unfortunately, this imposes a substantial burden on the UE as at large bandwidths the control region may be very large. In conventional methods, to the reduce the burden of the blind decoding task at the UE to a small extent, the whole control region is sub-divided into common search space and UE-specific search spaces which the UE should monitor (attempt to decode each of the PDCCHs). Each space comprises 2, 4, or 6 PDCCH candidates whose data length depends on the PDCCH format; each PDCCH must be transmitted on 1, 2, 4, or 8 CCE(s) (1 CCE=9 REGs=9*4 REs=72 bits). The AL, size of CCEs, and number of PDCCH candidate for each common search space (CSS) and the UE-specific search space (USS) are shown below in Table 1:

TABLE 1

| Search Space Type | LTE Search Space | | |
|---|---|---|---|
| | Aggregation Level (L) | Size in CCEs | Number of PDCCH Candidates |
| USS | 1 | 6 | 6 |
| | 2 | 12 | 6 |
| | 4 | 8 | 2 |
| | 8 | 16 | 2 |
| CSS | 4 | 16 | 4 |
| | 8 | 16 | 2 |

Furthermore, in the 5G systems, system bandwidth is divided into bandwidth parts (BWP). Each BWP may be configured up to three control resource sets (CORESETs), on which the UE may receive DCI message. The CORESET is a set of physical resources that is used to carry PDCCH/DCI. A control-resource set includes—resource blocks in the frequency domain and $\in \{1,2,3\}$ symbols in the time domain.

The UE may be configured with up to 4 BWPs and at least one BWP will be active at any point of time. Each BWP may be configured with up to 3 control-resource sets. A maximum of three CORESETs may be configured for an active DL BWP. Number of CCEs in each CORESET is configurable. Search Space sets within in each CORESET are also configurable. The UE performs blind decoding for a set of PDCCH candidates. PDCCH candidates to be monitored are configured for the UE by means of search space (SS) sets (a) Common SS (CSS) Set: Monitors by group of UEs, and (b) UE SS(USS) Set: monitored by specific UE.

In an example, the UE is assigned with one CORESET which has 4 search space sets, one CSS set with 16 CCEs and three USS sets with 12, 16, 12 CCEs respectively. The AL, size of CCEs, and number of PDCCH candidate for a CORSET (j) e.g., common search space (CSS) in search space set (j) and the UE-specific search space (USS) in search space set (j) are shown below in Table 2:

TABLE 2

| | Number of CCEs in the search space set (j) | AL = 1 | AL = 2 | AL = 4 | AL = 8 | AL = 16 | Total PDDCH Candidates |
|---|---|---|---|---|---|---|---|
| CSS Set j = 0 | 16 | 0 | 0 | 0 | 2 | 1 | 3 |
| USS Set j = 0 | 12 | 8 | 1 | 2 | 1 | 0 | 12 |
| USS Set j = 1 | 16 | 8 | 3 | 2 | 2 | 1 | 16 |
| USS Set j = 2 | 12 | 8 | 3 | 1 | 1 | 0 | 13 |

Therefore, as the bandwidth of the wireless communication network the number of possible ALs used for the PDCCH data also increases and thus the UE has to spend more resource and time in the PDCCH blind decoding. The existing methods used by the UE to perform blind decoding of the PDCCH data are explained in FIG. 4A.

Figure 4A:
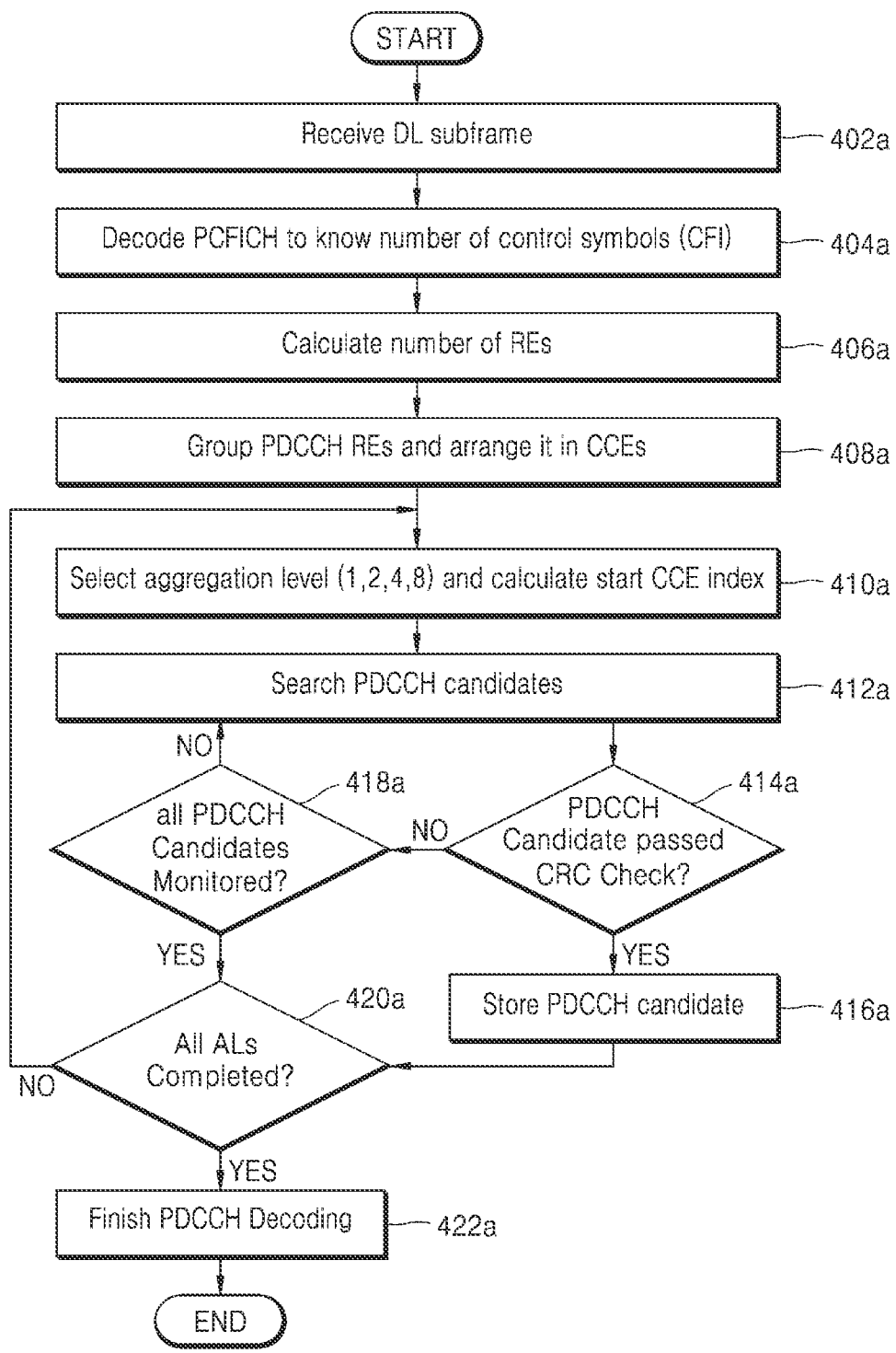
FIG. 4A is a flowchart illustrating a conventional method for blindly decoding a PDCCH data by the UE in the wireless network system (e.g., 4G wireless network system)

FIG. 4A is a flowchart illustrating a conventional method (400a) for blindly decoding a PDCCH data by the UE in the wireless network system. In the conventional method (400a), the UE performs blind decoding for extracting DCI message from the PDCCH data. At operation 402a, the method (400a) includes receiving, by the UE, a downlink (DL) subframe which may carry the PDCCH data for the UE. At operation 404a, the method (400a) includes decoding, by the UE, the PCFICH to determine a number of OFDM control symbols used by the BS for the PDCCH data transmission.

At operation 406a, the method (400a) includes calculating, by the UE, a number of REs used for the PDCCH data=(Total REs−REs of PCFICH−REs of PHICH−REs of reference symbol). At operation 408a, the method (400a) includes grouping, by the UE, the determined REs for the PDCCH data to determine a number of CCEs used for the PDCCH data transmission. In case of 4G wireless network system the determined REs are grouped in quadruples as one REG is equal to four REs and one CCE is equal to 9 REGs in the 4G wireless system. In another example, in the 5G wireless network system, the REs may be grouped such that each group has 12 REs because one REG is equal to one resource block (RB) which is equivalent to 12 REs in the 5G wireless network system, and one CCE is equal to 6 REGs in the 5G wireless network system.

At operation 410a, the method (400a) includes selecting, by the UE, one AL from a number of possible ALs (1, 2, 4, 8) in the 4G wireless network system, and from a number of possible ALs (1, 2, 4, 8, 16) in the 5G wireless network system, and calculating start CCE index based on a radio network temporary identifier (RNTI) value, a subframe number, the determined number of CCEs, and the selected AL. At operation 412a, the method (400a) includes searching, by the UE, the PDCCH candidate on CCE indexes by unmasking the RNTI value for the selected AL.

At operation 414a, the method (400a) includes determining whether the searched PDCCH candidate passed the cyclic redundancy check (CRC). If the searched PDCCH candidate passed the CRC then the method (400a) proceeds to operation 416a otherwise the method (400a) proceeds to operation 418a. At operation 416a, the method (400a) includes storing, by the UE, the PDCCH candidate in a PDCCH buffer to find out a PDCCH format and a DCI format. At operation 418a, the method (400a) includes determining whether all PDCCH candidates for the selected AL are monitored. If all PDCCH candidates for the selected AL are monitored, the method proceeds to operation 420a, and if all PDCCH candidates for the selected AL are not monitored then the method (400a) proceeds to operation 412a to search another PDCCH candidate for the CRC check.

From operation 416a, the method (400a) proceeds to operation 420a. At operation 420a, the method (400a) includes determining whether all possible ALs are completed for the PDCCH candidate search. If all possible ALs are completed for the PDCCH candidate search, the method (400a) proceeds to operation 422a and finish the PDCCH decoding, but if all possible ALs are not completed then the method (400a) proceeds to operation 410a and check for left possible ALs for the PDCCH candidate search.

Figure 4B:
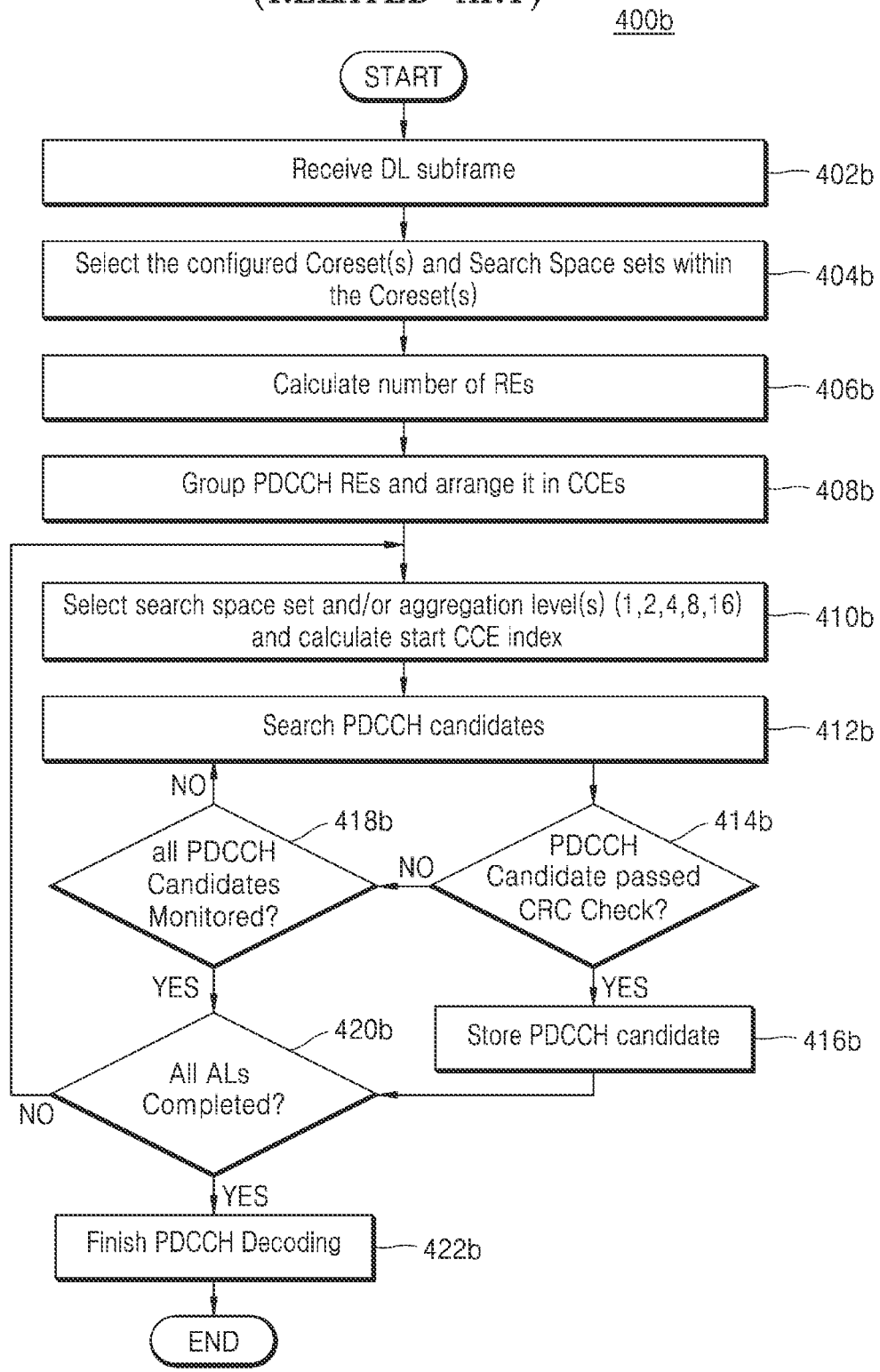
FIG. 4B is another flowchart illustrating a conventional method for blindly decoding a PDCCH data by the UE in the wireless network system (e.g., 5G wireless network system)

In an example, as shown in FIG. 4B, it shall be noted that if the wireless network system is the 5G wireless network system then the conventional method (400b) will also include operations of first determining possible search space sets in which the PDCCH data is transmitted and then the same or similar operations from (404-422) are performed to determine PDCCH candidate and DCI message.

FIG. 4B is a flowchart illustrating a conventional method (400b) for blindly decoding a PDCCH data by the UE in the wireless network system. In the conventional method (400b), the UE performs blind decoding for extracting DCI message from the PDCCH data. At operation 402b, the method (400b) includes receiving, by the UE, the DL subframe which may carry the PDCCH data for the UE. At operation 404b, the method (400a) includes selecting the configured coreset(s) and search space sets within the corset(s).

At operation 406b, the method (400b) includes calculating, by the UE, a number of REs used for the PDCCH data. The number of REs is equal to number of search space sets * no. of CCEs with in each set * 72. At operation 408b, the method (400b) includes grouping, by the UE, the determined REs for the PDCCH data to determine a number of CCEs used for the PDCCH data transmission. In another example, in the 5G wireless network system, the REs may be grouped such that each group has 12 REs because one REG is equal to one resource block (RB) which is equivalent to 12 REs in the 5G wireless network system, and one CCE is equal to 6 REGs in the 5G wireless network system. The remaining operations (410b-422b) are similar to operations (410a-422a), for the sake of brevity, the description of the similar operations may not be repeated here.

Therefore, in the existing direct discovery methods (400a and 400b), the UE has to perform the operations 410a-420a or 410b-420b repeatedly until the UE received the DCI message from the PDCCH data. Conventionally the UE starts with AL=8, then goes to AL=4, then AL=2, then AL=1 for 4G wireless network system, and for 5G wireless network systems the UE starts with AL=16 and goes on till AL=1. Therefore, this puts a lot of burden at the UE and effects the overall performance efficiency of the UE.

The above noted short comings are addressed by an intelligent method and system for predicting AL and/or search space sets intelligently to reduce the burden on the UE and these intelligent method and system are illustrated collectively in FIGS. 5-16.

Figure 5:
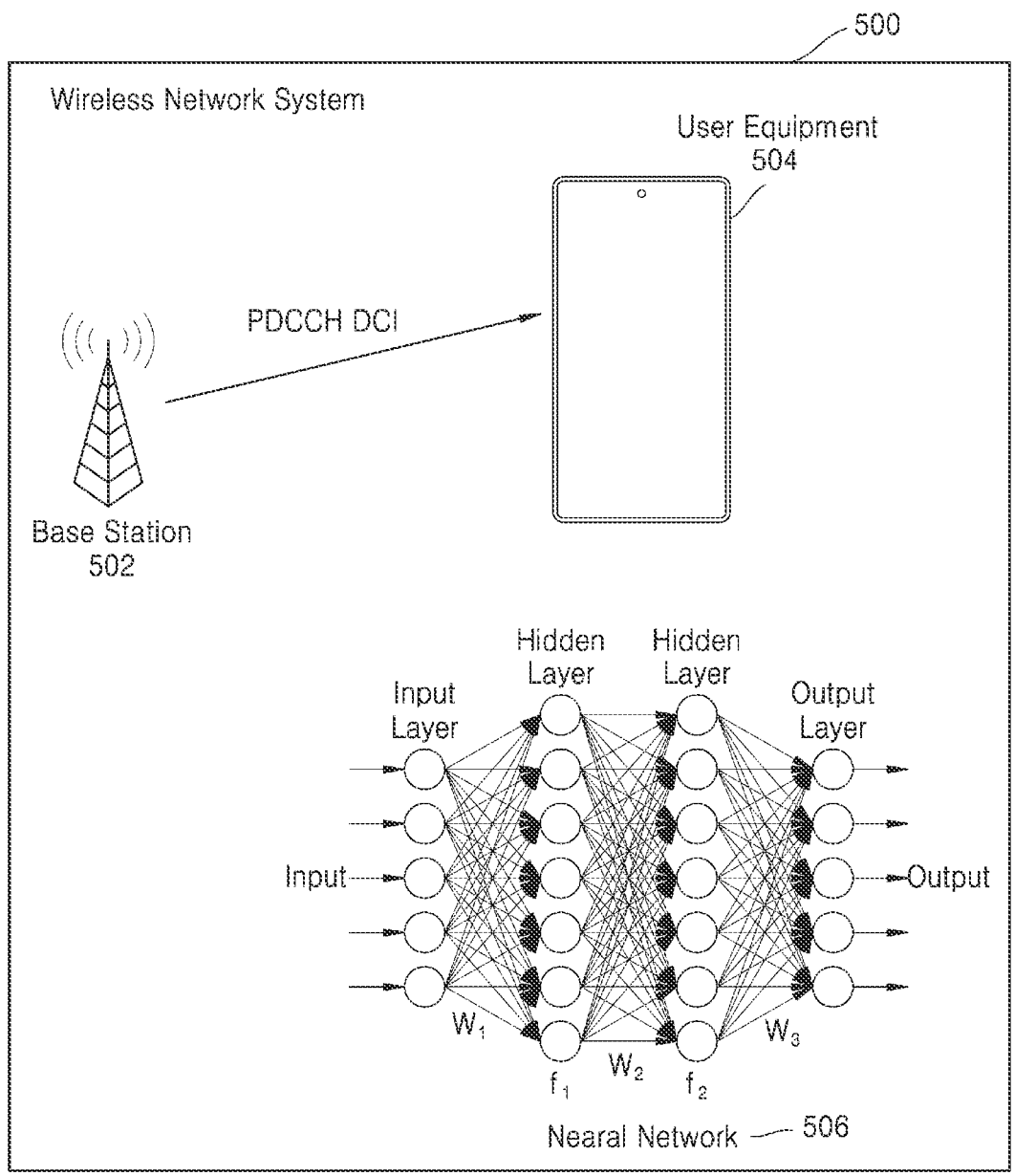
FIG. 5 is a diagram illustrating an example network diagram depicting the UE including an NN for decoding PDCCH data received from the BS, according to various embodiments.

FIG. 5 is a diagram illustrating an example wireless network system (500) illustrating the UE (504) including a neural network (NN) (506) for decoding PDCCH data received from the BS (502), according to various embodiments.

As shown in FIG. 5, the BS (502) sends the PDCCH data to the UE (504) and the UE (504) comprises the NN (506) which is a trained NN working in a testing operation mode. The NN (506) may be configured to predict the AL and/or the search space set based on a plurality of network parameters provided as input to the NN (506). The AL and/or search space set predicted by the NN (506) may be the AL and/or search space set from plurality of ALs and/or search space sets which has highest probability of being used for the PDCCH data transmission by the BS (502). The UE (504) may provide plurality of network parameters as input to a trained ML model (for example NN (506)), and obtain at least one predicted AL as output from the ML model (for example NN (506)).

The NN (506) may also provide more than one AL and/or search space set in a increasing order or decreasing order of probability that the PDCCH candidate is transmitted using the respective AL and/or the respective search space set. For example, for 4G wireless network system, the NN (506) may provide AL=4 as the AL with probability (e.g., highest probability or shortest probability) of being used by the BS (502) for the PDCCH data transmission followed by AL=8 with less probability of being used by the BS for the PDCCH data transmission than the AL=4, and so on. The probability may depend on various parameters (e.g., channel conditions, location, or the like). For 5G wireless network system, the NN (506) may provide a search space set (j) with highest probability of being used by the BS (502) for the PDCCH data transmission followed by a search space set (i) with less probability of being used by the BS (502) for the PDCCH data transmission than the search space set (j), and in the 5G wireless network system the NN (506) may also provide AL=8 as the AL with highest probability of being used by the BS (502) for the PDCCH data transmission followed by AL=16 with less probability of being used by the BS (502) for the PDCCH data transmission than the AL=4, and so on.

Therefore, the NN (506) intelligently predicts ALs and/or search space sets which increases the chance of getting the DCI message in the first search attempt by the UE (504), and reduces the efforts of the UE (504).

The plurality of network parameters may comprise at least one of: current channel conditions, an hybrid automatic repeat request (H-ARQ) feedback, or a downlink control information (DCI) grant size. The plurality of network parameters may comprise at least one of: current channel conditions, a downlink hybrid automatic repeat request (H-ARQ) feedback, an uplink H-ARQ feedback, a DCI grant size, a frequency range used by the BS (502), a numerology used by the BS (502), a numerology used by the UE (504), an active bandwidth part (BWP) configured by the BS (502) for the UE (504), a passive BWP configured by the BS (502) for the UE (504), a CORESET information, a search space set information, measurements of the UE (504) on different frequencies, a RSRP, a RSRQ, a RSSI, a beam index, a neighbouring BS frequency reuse factors, BS capability, UE capability, IIR filtered information or correlation exploitation, aggregation levels for previous TTI, a weighted aggregation levels for 'n' number of previous TTI, search space set information, an operating frequency of the BS (502), a BS transmission type, a function of BS transmission mode for the UE (504), a time division duplexing (TDD), a frequency division duplexing (FDD) or dynamic TDD information, a BS transmit power, BS index, a channel estimation of the UE (504) on different UL and DL channels, a Doppler frequency, mobility information of the UE (504), a speed of the UE (504), a velocity of the UE (504) w.r.t the BS (502), one of a time of present day, an identifier of the BS (502), a frequency of operation of the BS (502), a location information of the UE (504), a location information of the BS (502), a density of traffic associated with the BS (502), a distribution of traffic associated with the BS (502), a category of the BS (502), climate conditions, information of special occasions on a present day of the year, a calendar based event of the UE (504), a vacation details of the UE (504), a category of the UE (504), a subscription details of the UE (504), or a capability of the UE (504). Further, the method may use a filter for using a specific network parameter using markov, IIR/FIR, averaging methods.

The current channel conditions may comprise at least one of: the RSSI, the signal inference noise ratio (SINR), a channel co-efficient matrix "H", a channel quality indicator (CQI), a rank index (RI), a pre-coding matrix index (PMI), the RSRP, or a number of antenna ports.

In an embodiment, the BS (502) may also use the NN (506) to intelligently encode the PDCCH data based on the plurality of network parameters. The NN (506) is explained in detail with reference to FIGS. 6-9 with respect to 4G wireless network system and 5G wireless network system respectively.

Figure 6:
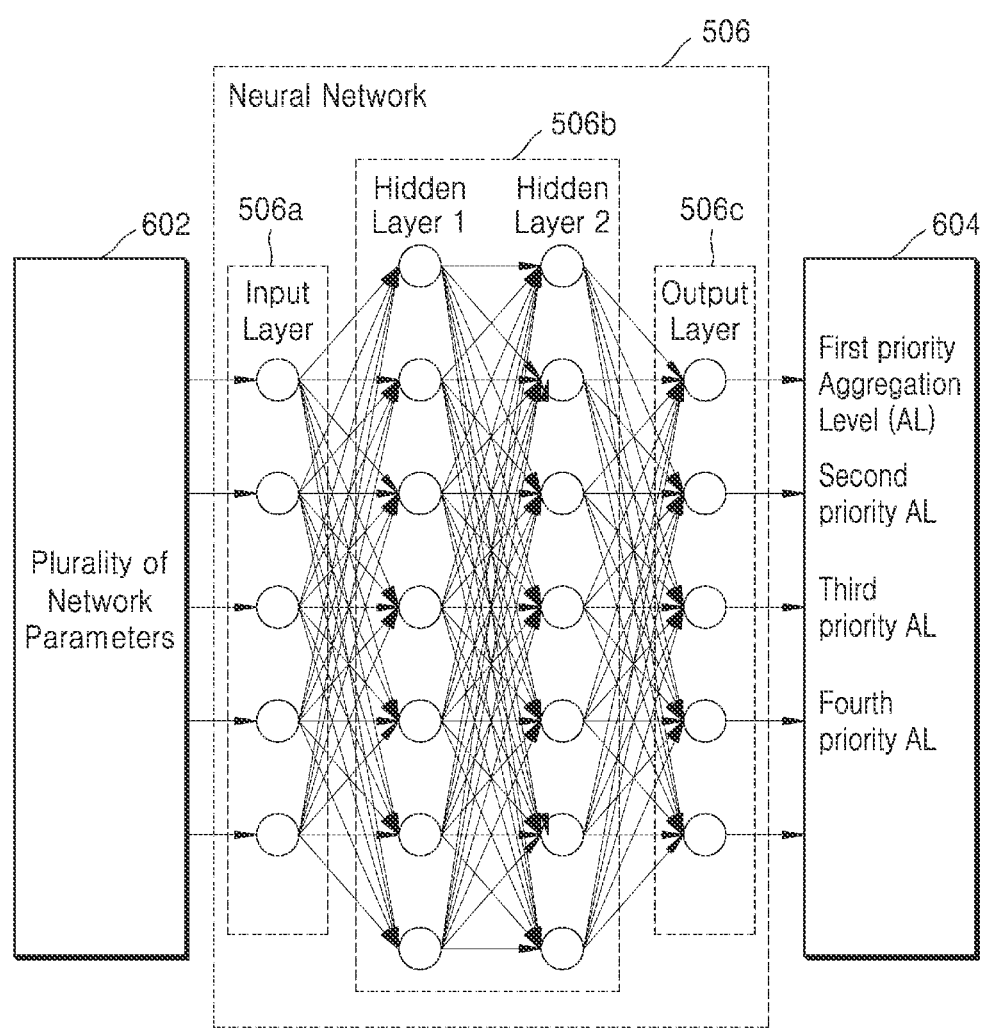
FIG. 6 is a diagram illustrating example components of the NN used by the UE for decoding the PDCCH data received from the BS in the 4G wireless system, according to various embodiments.

FIG. 6 is a diagram illustrating example components of the NN (506) used by the UE (504) for decoding the PDCCH data received from the BS (502) in the 4G wireless system, according to various embodiments.

As shown in FIG. 6, the NN (506) may comprise an input layer (506*a*), one or more hidden layers (506*b*), and an output layer (506*c*). Input (602) is given to the input layer of the NN (506). The input (602) comprises the plurality of network parameters. The NN (506) generates an output (604). The output (604) comprises at least one AL. The output (604) may comprise ALs based on priority such as a first priority AL, a second priority AL, a third priority AL or a fourth priority AL. The priority assigned to different ALs generated as output are based on probability of the respective AL being used for PDCCH data transmission by the BS (502).

In an embodiment, the NN (506) is operable in two example operating modes: a) training mode and b) testing mode. In the training mode of the NN (506), weights are assigned to each layer of the NN (506) (e.g., the input layer (506*a*), the hidden layers (506*b*), and the output layer (506*c*)) and an activation function is applied to the summation of the weights of each layer of the NN (506). The NN (506) generates the output based (604) on the applied weights and the activation function. An error function of the output (604) of the NN (506) is determined, and further the error function of the output (604) of the NN (506) is compared with a threshold error value. If the error function of the output (604) of the NN (506) is less than the threshold error value, then the operating mode of the NN (506) is changes to testing mode in which the NN (506) may be deployed to estimate the ALs in real-time environment. The NN (506) is kept under training until an error function of the output (604) of the NN (506) is less than the threshold error value. Upon sufficient training the NN (506) becomes capable of predicting the AL based on the plurality of network parameters.

In a non-limiting example embodiment, the activation function used in the NN (506) is a ReLu activation function. However, other activation function may also be used such as unit step, signum, linear regression, piece-wise linear, hyperbolic tangent, logistic (sigmoid), rectifier softplus, etc.

The training of the NN (506) may be conducted based on a belief propagation, a back-propagation, or an adaptive learning optimization (Adam).

The NN (506) utilizes the outputs (604) in previous TTIs using IIR filter technique, FIR filter technique in which either an average of the outputs (604) in previous TTIs is given as input parameter to the input layer (506a) of the NN (506) or a weighted average of the outputs (604) in n number of previous TTIs given as input parameter to the input layer (506a) of the NN (506), where n can be any natural number.

Accordingly, the UE (504) is configured to intelligently pick an AL among the possible ALs (1, 2, 4, or 8) which may help in extracting the DCI message in the first attempt or at least in less number of attempts than blind decoding.

It shall be noted that only two hidden layers of the NN (506) are shown for illustrative purpose of the disclosure but a person skilled in the art will understand that more than two hidden layer may also be used in the NN (506) without deviating from the scope of the disclosure.

Figure 7:
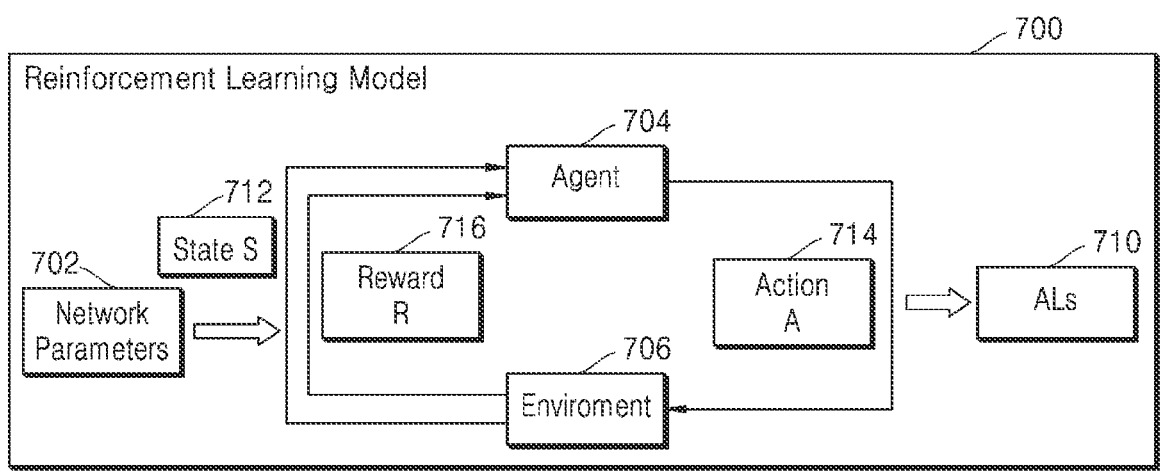
FIG. 7 is a diagram illustrating an example reinforcement learning (RL) model used by the UE for decoding the PDCCH data received from the BS in the 4G wireless system, according to various embodiments.

FIG. 7 is a diagram illustrating an example configuration of a reinforcement learning (RL) model (700) used by the UE (504) for decoding the PDCCH data received from the BS (502) in the 4G wireless system, according to various embodiments.

The RL model (700) comprises an RL agent (704) which interacts with the network environment of the wireless network system (500) and receives the plurality of network parameters as input (702). Based on the received input, a policy and value function of the RL model (700), and a current state S (712) of the RL model, the RL model is configured to generate an output (710). The output (710) of the RL model (700) comprises at least one AL. The output (710) of the RL model (700) may comprise ALs based on priority such as a first priority AL, a second priority AL, a third priority AL or a fourth priority AL. The priority assigned to different ALs generated as output are based on probability of the respective AL being used for PDCCH data transmission by the BS (502). For example, the RL model (700) determines that AL=8 has highest probability of being used by the BS (502) for the PDCCH data transmission followed by AL=2, AL=4, and AL=1, then the first priority AL will be AL=8, the second priority AL will be AL=2, the third priority AL will be AL=4, and the fourth priority AL will be AL=1.

The output (710) generated by the RL model (700) is used to take an action (714) by the RL agent (704) which is searching PDCCH candidate and accordingly extract DCI message. If the output (710) provided by the RL model successfully lead to the correct CCE index to find the PDCCH then a positive reward R (716) is provided to the RL agent (704) based on the performed action (714). However, if the output (710) provided by the RL model does not successfully lead to the correct CCE index to find the PDCCH then a negative reward R (716) is provided to the RL agent (704) based on the performed action (714). For example, the output (710) predicted by the RL model depicts that AL=8 have highest probability of being used by the BS (502) for the PDCCH data transmission and if the PDCCH candidate including the DCI message for the UE (504) is found using the AL=8 then positive reward is provided to the RL agent (704). Similarly if the output (710) of the RL model provides multiple ALs with different priorities then reward will be given based on which AL amongst the multiple ALs successfully leads to extraction of the DCI message, so if the second priority AL leads to successful extraction of the DCI message than the first priority AL, a less reward value will be given to the RL agent (704).

Accordingly, with more interaction with the environment (706), the RL model becomes more and more accurate and robust based on the positive and negative rewards R (716) received by the RL agent (704) and accordingly the policy and state value function of the RL model (700) also gets updated. Further the RL model is put into testing operation mode when an error function of the output (710) is less than a threshold error value.

Accordingly, the UE (504) is configured to intelligently pick an AL among the possible ALs (1, 2, 4, or 8) which may help in extracting the DCI message in the first attempt or at least in less number of attempts than blind decoding.

The RL model (700) utilizes the outputs (710) in previous TTIs using Markov chain model in which a transition probability matrix is generated for previous correct ALs predicted by the RL model (700) in previous TTIs, and the transition probability may be used as input parameter to the RL model (700). In such scenarios the current state S (712) will be a function of previous state and action taken by the RL agent (704).

Figure 8:
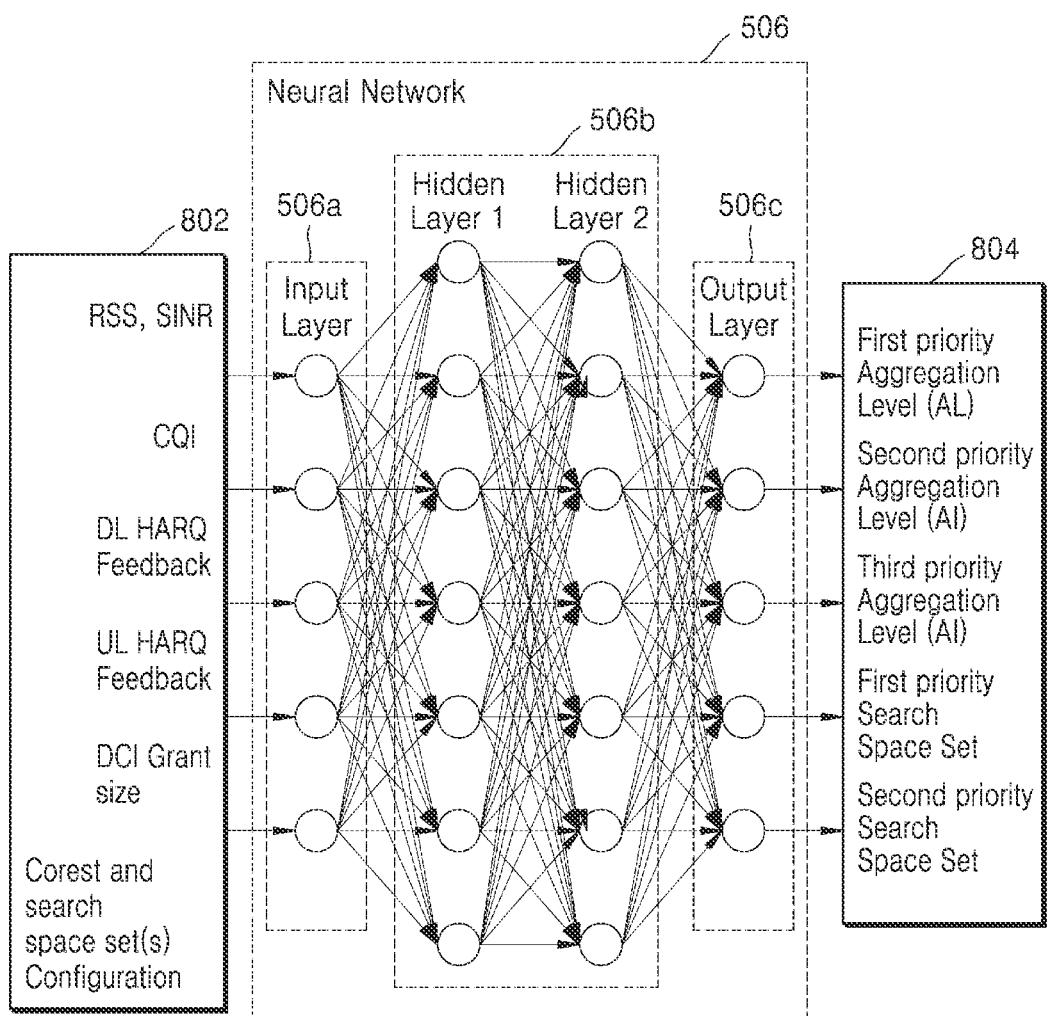
FIG. 8 is a diagram illustrating example components of the NN used by the UE for decoding the PDCCH data received from the BS in the 5G wireless system, according to various embodiments.

FIG. 8 is a diagram illustrating an example configuration of the NN (506) used by the UE (504) for decoding the PDCCH data received from the BS (502) in the 5G wireless system, according to various embodiments.

As shown in FIG. 8, the NN (506) may comprise the input layer (506a), one or more hidden layers (506b), and the output layer (506c). Input (802) is given to the input layer (506a) of the NN (506). The input (802) comprises the plurality of network parameters. The NN (506) generates an output (804). The output (804) comprises at least one AL. The output (804) may comprise ALs and/or search space sets based on priority such as a first priority AL, a second priority AL, a third priority AL, a first priority search space set, or a second priority search space set. The priority assigned to different ALs and/or search space sets generated as output are based on probability of the respective AL and/or search space set being used for PDCCH data transmission by the BS (502). For example, NN (506) determines that a search space set (j) has highest probability of being used by the BS for the PDCCH data transmission followed by a search space set (i) with less probability of being used by the BS for the PDCCH data transmission than the search space set (j), and further the AL=8 has highest probability of being used by the BS (502) for the PDCCH data transmission followed by AL=16, followed by AL=4, then the first priority AL will be AL=8, the second priority AL will be AL=16, the third priority AL will be AL=4, and the first priority search space set will be search space set (j) and the second priority search space set will be search space set (i).

In an embodiment, the NN (506) is operable in two operating modes: a) training mode and b) testing mode. In the training mode of the NN (506), weights are assigned to each layer of the NN (506) (e.g., the input layer (506a), the hidden layers (506b), and the output layer (506c)) and an activation function is applied to the summation of the weights of each layer of the NN (506). The NN (506) generates the output based (604) on the applied weights and the activation function. An error function of the output (804) of the NN (506) is determined, and further the error function of the output (804) of the NN (506) is compared with a threshold error value. If the error function of the output (804) of the NN (506) is less than the threshold error value, then the operating mode of the NN (506) is changes to testing mode in which the NN (506) may be deployed to estimate the ALs and/or search space sets in real-time environment. The NN (506) is kept under training until an error function of the output (804) of the NN (506) is less than the threshold error value. Upon sufficient training the NN (506) becomes capable of predicting the AL and/or search space set based on the plurality of network parameters.

In a non-limiting example embodiment, the activation function used in the NN (506) may be a ReLu activation function. However, other activation function may also be used such as unit step, signum, linear regression, piece-wise linear, hyperbolic tangent, logistic (sigmoid), rectifier softplus, etc.

The training of the NN (506) is conducted based on the belief propagation, the back-propagation or the adaptive learning optimization (Adam).

The NN (506) utilizes the outputs (604) in previous TTIs using IIR filter technique, FIR filter technique in which either an average of the outputs (604) in previous TTIs is given as input parameter to the input layer (506a) of the NN (506) or a weighted average of the outputs (604) in n number of previous TTIs given as input parameter to the input layer (506a) of the NN (506), where n can be any natural number.

Accordingly, the UE (504) is configured to intelligently start the search for the PDCCH candidate for the DCI message based on the priority order of the ALs and/or the search space sets provided by the NN (506) rather than blindly following a conventional sequence of all possible ALs and search space sets to search for the right PDCCH candidate.

It shall be noted that only two hidden layers of the NN (506) are shown for illustrative purpose of the disclosure but a person skilled in the art will understand that more than two hidden layer may also be used in the NN (506) without deviating from the scope of the disclosure.

Figure 9:
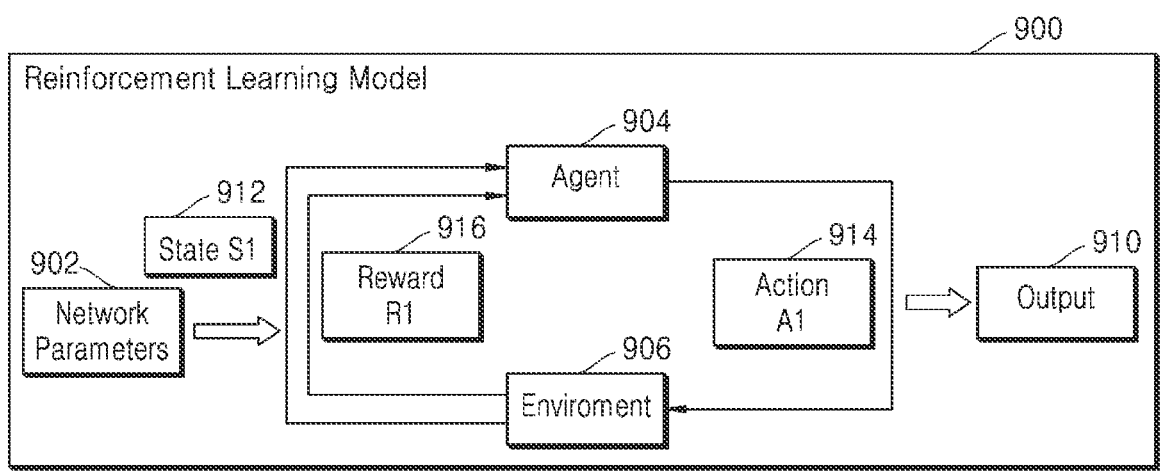
FIG. 9 is a diagram illustrating an example RL model used by the UE for decoding the PDCCH data received from the BS in the 5G wireless system, according to various embodiments.

FIG. 9 is a diagram illustrating an example configuration of a reinforcement learning (RL) model (900) used by the UE (504) for decoding the PDCCH data received from the BS (502) in the 5G wireless system, according to various embodiments. It shall be noted that the RL model (700) and the RL model (800) may be the same or similar models or different models.

The RL model (900) comprises an RL agent (904) which interacts with the network environment of the wireless network system (500) and receives the plurality of network parameters as input (902). Based on the received input, a policy and value function of the RL model (900), and a current state S1 (912) of the RL model, the RL model is configured to generate an output (910). The output (910) of the RL model (900) comprises at least one AL. The output (910) of the RL model (900) may comprise ALs and/or search space sets based on a priority such as first priority AI, a second priority AL, a third priority AL, a first priority search space set or a second priority search space set. The priority assigned to different ALs and/or search space sets generated as output are based on probability of the respective AL and/or search space set being used for PDCCH data transmission by the BS (502). For example, the RL model (700) determines that a search space set (j) has highest probability of being used by the BS for the PDCCH data transmission followed by a search space set (i) with less probability of being used by the BS for the PDCCH data transmission than the search space set (j), and further the AL=8 has highest probability of being used by the BS (502) for the PDCCH data transmission followed by AL=16, followed by AL=4, then the first priority AL will be AL=8, the second priority AL will be AL=16, the third priority AL will be AL=4, and the first priority search space set will be search space set (j) and the second priority search space set will be search space set (i).

The output (910) generated by the RL model (900) is used to take an action (914) by the RL agent (904) which is searching PDCCH candidate and accordingly extract DCI message. If the output (910) provided by the RL model successfully lead to the correct CCE index to find the PDCCH then a positive reward R1 (916) is provided to the RL agent (904) based on the performed action (914). However, if the output (910) provided by the RL model does not successfully lead to the correct CCE index to find the PDCCH then a negative reward R1 (916) is provided to the RL agent (904) based on the performed action (914). For example, the output (910) predicted by the RL model depicts that AL=8 have highest probability of being used by the BS (502) for the PDCCH data transmission and if the PDCCH candidate including the DCI message for the UE (504) is found using the AL=8 then positive reward R1 (916) is provided to the RL agent (904). Similarly if the output (910) of the RL model provides multiple ALs with different priorities then reward R1 (916 will be given based on which AL amongst the multiple ALs successfully leads to extraction of the DCI message, so if the second priority AL leads to successful extraction of the DCI message than the first priority AL, a less reward value will be given to the RL agent (904).

Accordingly, with more interaction with the environment (906), the RL model becomes more and more accurate and robust based on the positive and negative rewards R1 (916) received by the RL agent (904) and accordingly the policy and state value function of the RL model (900) also gets updated. Further the RL model is put into testing operation mode when an error function of the output (910) is less than a threshold error value.

Accordingly, the UE (504) is configured to intelligently pick an AL among the possible ALs (1, 2, 4, or 8) which may help in extracting the DCI message in the first attempt or at least in less number of attempts than blind decoding.

The RL model (900) utilizes the outputs (910) in previous TTIs using Markov chain model in which a transition probability matrix is generated for previous correct ALs predicted by the RL model (900) in previous TTIs, and the transition probability may be used as input parameter to the RL model (900). In such scenarios the current state S1 (912) will be a function of previous state and action taken by the RL agent (904). These method may be placed in on-device systems or hardware implementations. BS (502) may periodically, aperiodically, or on demand basis, convey information to the UEs (504). Information may be about NN weights, ML, or AI related parameters.

In an embodiment, the PDCCH data is decoded using a Markov chain model based on at least one of a past aggregation level and a decoding state of the PDCCH data.

In an embodiment, the PDCCH data is decoded using a greedy mechanism, wherein the greedy mechanism starts the PDCCH decoding with a higher aggregation level and moves towards a lower aggregation level, and the UE stops the greedy mechanism upon finding DCI payloads at a specified aggregation level with expected DCI sizes and does not proceed with searching DCI in remaining aggregation levels. This method reduces UE power consumption as compared to the existing algorithm.

The Greedy mechanism further chooses a starting aggregation level based on a channel conditions (e.g., RSSI, SINR, CQI, RI, PMI, RSRP, number of antenna ports, HARQ feedback and other parameters). This will further reduce UE power consumption as compared to Greedy mechanism which improves UE battery life.

In an embodiment, the greedy mechanism may configured to start searching PDCCH candidates in the at least one predicted AL, and upon finding a PDCCH payload stop the searching and do not proceed with searching remaining PDCCH candidates in the at least one predicted AL.

Further, the disclosed Greedy mechanism may also be generalized to select appropriate search space sets to be monitored based on the channel conditions and other parameters for 5G system using AI and ML. This will further reduce UE power consumption as compared to existing and greedy algorithm.

In an embodiment, the ML model using NN (506) and the RL model (900) may be trained for each BS. For example, the ML model may be an NN associated with the BS (502), that is trained using a dataset including a plurality of network parameters and a corresponding AL used by the BS (502) to transmit PDCCH data.

In an embodiment, UE (504) may receive a decoding feedback using the at least one predicted AL and update the ML model based on the received decoding feedback.

Figure 10:
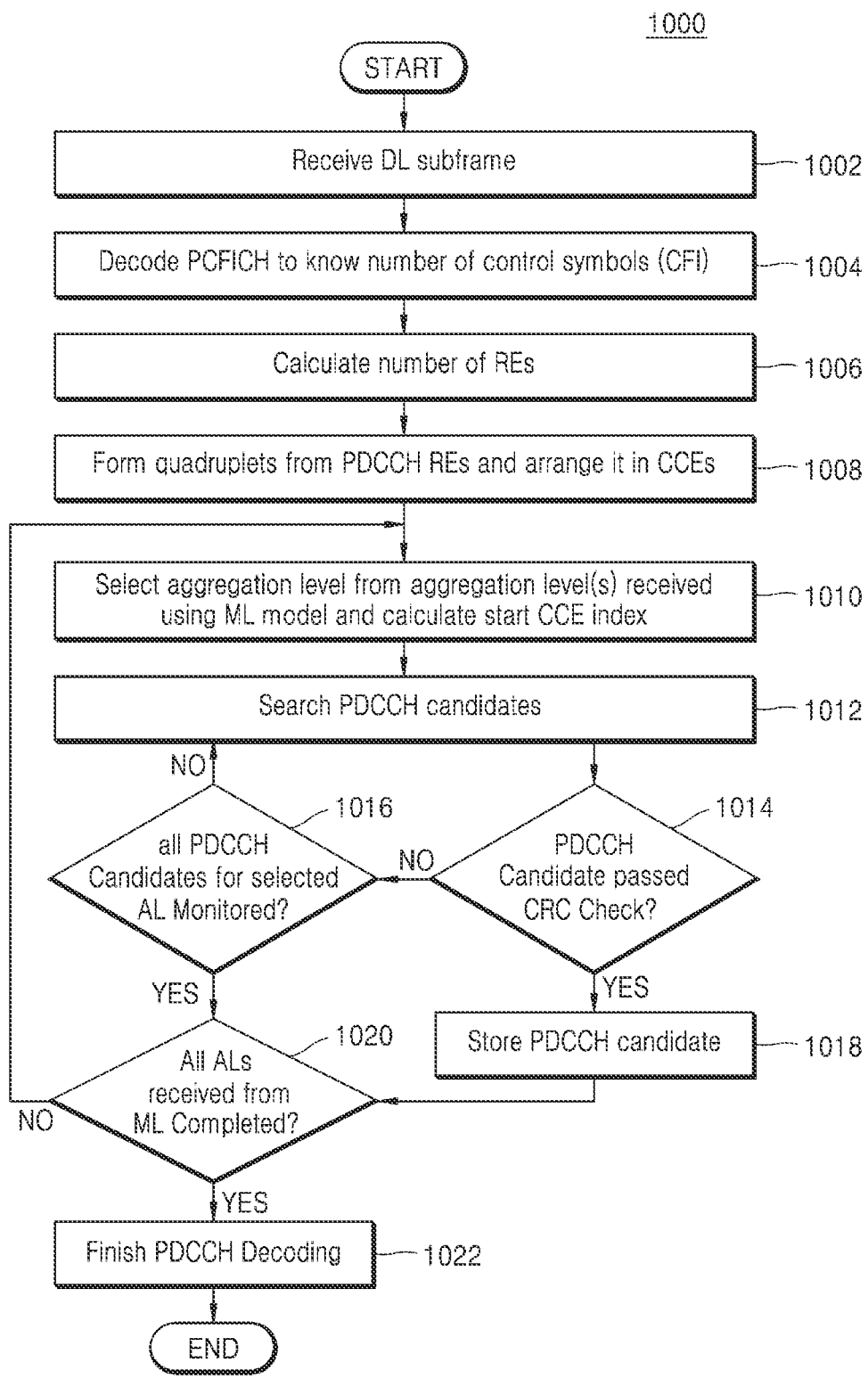
FIG. 10 is a flowchart illustrating an example method of intelligently decoding PDCCH data received from the BS based on ML model in a 4G wireless network system, according to various embodiments.

FIG. 10 is a flowchart illustrating an example method (1000) of intelligently decoding PDCCH data received from the BS based on machine learning (ML) model in the 4G wireless network system according to various embodiments. The operations (1002-1022) may be performed by the processor (1202) (refer to FIG. 12).

At operation 1002, the method (1000) includes receiving, by the UE (504), a downlink (DL) subframe which may carry the PDCCH data for the UE (504). At operation 1004, the method (400) includes decoding, by the UE (504), the PCFICH to determine a number of OFDM control symbols used by the BS (502) for the PDCCH data transmission.

At operation 1006, the method (1000) includes calculating, by the UE (504), a number of REs used for the PDCCH data=(Total REs−REs of PCFICH−REs of PHICH−REs of reference symbol). At operation 1008, the method (1000) includes forming, by the UE (504), quadruples of the determined REs for the PDCCH data to determine a number of CCEs used for the PDCCH data transmission. In case of 4G wireless network system the determined REs are grouped in quadruples as one REG is equal to four REs and one CCE is equal to 9 REGs in the 4G wireless system as shown in FIG. 2. Similarly, one REG is equal to 12 REs and 1 CCE is equal to 6 REGs in 5G system as illustrated in FIG. 3.

At operation 1010, the method (400) may include selecting, by the UE (504), highest priority AL from a number of predicted ALs by the machine learning model (such as the NN (506), or the RL model (700)) in the 4G wireless network system, and the UE (502) calculates start CCE index based on a radio network temporary identifier (RNTI) value, a subframe number, the determined number of CCEs, and the selected AL. At operation 1012, the method (1000) includes searching, by the UE (504), the PDCCH candidate on the CCE indexes by unmasking the RNTI value for the selected AL.

At operation 1014, the method (1000) includes determining whether the searched PDCCH candidate passed the cyclic redundancy check (CRC). If the searched PDCCH candidate passed the CRC then the method (1000) proceeds to operation 1018 otherwise the method (1000) proceeds to operation 1016. At operation 1018, the method (1000) includes storing, by the UE (504), the PDCCH candidate in a PDCCH buffer to find out a PDCCH format and a DCI format. From operation 1018 the method (1000) proceeds to operation 1022 and finishes the PDCCH decoding. At operation 1016, the method (1000) includes determining whether all PDCCH candidates for the selected AL are monitored. If all PDCCH candidates for the selected AL are monitored, the method (1000) proceeds to operation 1020, and if all PDCCH candidates for the selected AL are not monitored then the method (1000) proceeds to operation 1012 to search another PDCCH candidate for the CRC check.

At operation 1020, the method (1000) includes determining whether all predicted ALs received from ML are completed for the PDCCH candidate search. If all predicted ALs received from ML are completed for the PDCCH candidate search, the method (1000) proceeds to operation 1022 to finish the PDCCH decoding, but if all predicted ALs received from ML are not completed then the method (1000) proceeds to operation 1010 to check for left ALs (for example next priority AL) among the predicted ALs for the PDCCH candidate search.

The various actions, acts, blocks, steps, or the like in the method (1000) may be performed in the order presented, in a different order, or simultaneously. Further, in various embodiments, some of the actions, acts, blocks, steps, or the like may be omitted, added, modified, skipped, or the like without departing from the scope of the disclosure.

Figure 11:
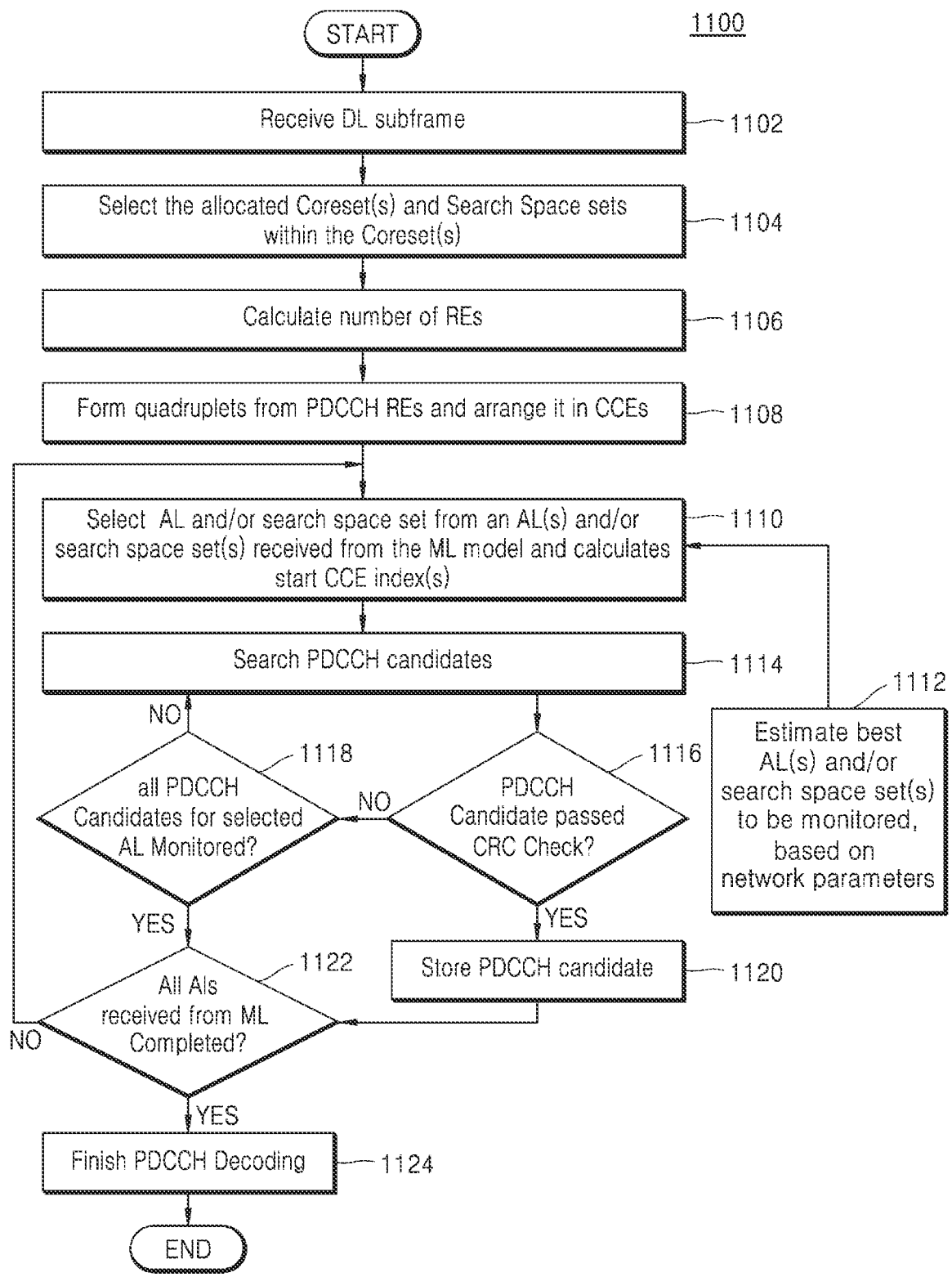
FIG. 11 is a flowchart illustrating an example method of intelligently decoding PDCCH data received from the BS based on ML model in a wireless network system, according to various embodiments.

FIG. 11 is a flowchart illustrating an example method (1100) of intelligently decoding PDCCH data received from the BS based on machine learning (ML) model in the wireless network system, according to various embodiments The operations (1102-1124) may be performed by the processor (1202).

At operation 1102, the method (1100) includes receiving, by the UE (504), a downlink (DL) subframe which may carry the PDCCH data for the UE (504). At operation 1104, the method (1100) includes selecting the allocated coreset(s) and search space sets within the corset(s).

At operation 1106, the method (1000) includes calculating, by the UE (504), a number of REs. In an example, in the 4Gsystem, a number of REs is used for the PDCCH data=(Total REs−REs of PCFICH−REs of PHICH−REs of reference symbol). In another example, in the 5G systems, the number of REs is equal to No. of search space sets * no. of CCEs with in each set * 72. At operation 1108, the method (1000) includes grouping, by the UE (504), the determined REs for the PDCCH data to determine a number of CCEs used for the PDCCH data transmission. In the 5G wireless network system, the REs may be grouped such that each group has 12 REs because one REG is equal to one resource block (RB) which is equivalent to 12 REs in the 5G wireless network system, and one CCE is equal to 6 REGs in the 5G wireless network system.

At operation 1110, the method (1100) may include selecting, by the UE (504), highest priority search space set and respective highest priority AL from a number of predicted ALs and/or search space sets by the machine learning model (such as the NN (506), or the RL model (900)) in the 5G wireless network system, and the UE (502) calculates start CCE index based on a radio network temporary identifier (RNTI) value, a subframe number, the determined number of CCEs for the AL across the selected search space sets within the corset(s). The predicted ALs and/or search space sets are estimated in operation 1112

At operation 1114, the method (1100) includes searching, by the UE (504), the PDCCH candidate on the CCE indexes by unmasking the RNTI value for the selected AL across the selected search space set.

At operation 1116, the method (1100) includes determining whether the searched PDCCH candidate passed the cyclic redundancy check (CRC). If the searched PDCCH candidate passed the CRC then the method (1100) proceeds to operation 1120 otherwise the method (1100) proceeds to operation 1118. At operation 1120, the method (1100) includes storing, by the UE (504), the PDCCH candidate in a PDCCH buffer to find out a PDCCH format and a DCI format. From operation 1120 the method (1100) proceeds to operation 1124 to finish the PDCCH decoding. In an embodiment, the UE (504) may decode the PDCCH data based on the at least one predicted AL, by searching a PDCCH candidate for the at least one predicted AL and detecting the PDCCH data from the searched PDCCH candidate when the searched PDCCH candidate passed CRC check.

At operation 1118, the method (1100) includes determining whether all PDCCH candidates for the selected AL are monitored or not. If all PDCCH candidates for the selected AL are monitored, the method (1100) proceeds to operation 1122, and if all PDCCH candidates for the selected AL are not monitored then the method (1100) proceeds to operation 1114 to search another PDCCH candidate for the CRC check.

At operation 1122, the method (1100) includes determining whether all predicted ALs received from ML are completed for the PDCCH candidate search. If all predicted ALs received from ML are completed for the PDCCH candidate search, the method (1100) proceeds to operation 1124 to finish the PDCCH decoding, but if all predicted ALs received from ML are not completed then the method (1100) proceeds to operation 1110 to check for left ALs (for example next priority AL) across left search space sets among the predicted ALs and/or search space sets for the PDCCH candidate search.

Figure 12:
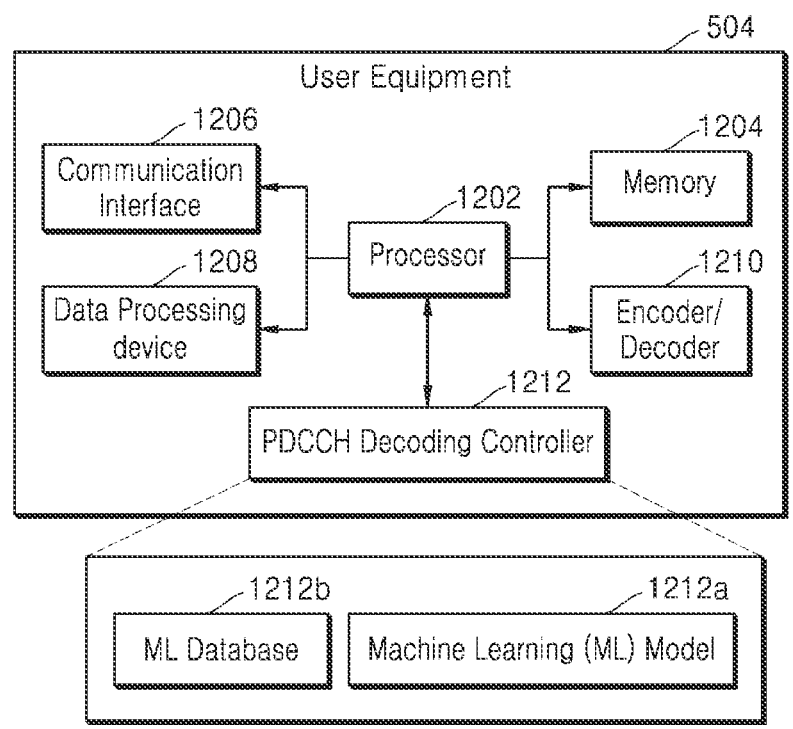
FIG. 12 is a block diagram illustrating an example configuration of the UE for intelligently decoding the PDCCH data received from the BS, according to various embodiments.

The various actions, acts, blocks, steps, or the like in the method (1100) may be performed in the order presented, in a different order or simultaneously. Further, in various embodiments, some of the actions, acts, blocks, steps, or the like may be omitted, added, modified, skipped, or the like without departing from the scope of the disclosure FIG. 12 is a block diagram illustrating an example configuration of the UE (504) for intelligently decoding the PDCCH data received from the BS, according to various embodiments.

The UE (504) comprises a processor (e.g., including processing circuitry) (1202), a memory (1204), and a PDCCH decoding controller (e.g., including various processing and/or control circuitry) (1212). The UE (504) may also comprise a communication interface (e.g., including communication circuitry) (1206), a data processing device (e.g., including data processing circuitry) (1208), and an encoder/decoder (1210). The PDCCH decoding controller (1212) may include a ML database (1212b) and an ML model (1212a). The ML model (1212a) is an example of the NN (506) and the RL models (700, 900). The components of the UE (504) provided herein may not be exhaustive and that the UE (504) may include more or fewer components than that of depicted in FIG. 12. Further, two or more components may be embodied in one single component, and/or one component may be configured using multiple sub-components to achieve the desired functionalities. Some components of the UE (504) may be configured using hardware elements, firmware elements and/or a combination thereof.

The processor (1202) may be coupled with the memory (1204), the communication interface (1206), the data processing device (1208), the encoder/decoder (1210), and the PDCCH decoding controller (1212). The processor (1202) may include various processing circuitry and is configured to execute instructions stored in the memory (1204) and to perform various processes. The communication interface (1206) may include various communication circuitry and is configured for communicating internally between internal hardware components and with external devices via one or more networks. The processor (1202) may include one or more processing units (e.g., in a multi-core configuration).

The memory (1204) stores instructions to be executed by the processor (1202). The memory (1204) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1204) may, in various examples, be considered a non-transitory storage medium. The term "non-transitory" may indicate that the storage medium is not embodied in a carrier wave or a propagated signal. However, the term "non-transitory" should not be interpreted that the memory (1204) is non-movable. In certain examples, a non-transitory storage medium may store data that can, over time, change (e.g., in Random Access Memory (RAM) or cache).

In an embodiment, the processor (1202) is configured to predict, using the PDCCH decoding controller (1212), one or more ALs in 4G wireless communication system, one or more ALs across one or more search space sets in 5G wireless communication network based on the plurality of network parameters using ML model (1212a). The processor (1202) is further configured to receive, with the help of the communication interface (1206), the plurality of network parameters. The processor (1202) is further configured to extract, with the help of the data processing device (1208), required network parameters from the plurality of network parameters using filtering. The data processing device (1208) performs functions such as modulation, filtering, noise cancellation to extract useful data from the received input data at the UE (504). Upon extracting the plurality of network parameters, the processor (1202) is configured to apply the ML model (1212a) to predict one or more ALs and/or one or more search space sets based on the priority. The ML model (1212a) is the trained NN (506) or the RL model (700, 900). The PDCCH decoding controller (1212) is configured to predict the one or more ALs and/or the one or more search space sets and further configured to store the predicted one or more ALs and/or the one or more search space sets in the ML database (1212b). The PDCCH decoding controller (1212) is configured to the one or more ALs and/or the one or more search space sets using the ML model (1212a) based on inputting the plurality of network parameters, if the ML model (1212a) is the trained NN (506) then the PDCCH decoding controller is configured to determine an optimal weight of each NN node based on a training algorithm, and optimizing the NN (506) based on the optimal weight of each NN node of the plurality of NN nodes, and the plurality of network parameters. The optimal weight corresponds to a weight corresponding to which the error function of the NN (506) is less than the threshold value. The training algorithm is the belief propagation, the back-propagation, or the adaptive learning optimization (Adam). In case the ML model (1212a) is the RL model (700, 900) the PDCCH decoding controller is configured to determine an optimum policy and state value function for which the error function of the output is less than the threshold error value. The PDCCH decoding controller is further configured to update the policy and state value function based on rewards received from the action performed by the RL agent (704).

The encoder/decoder (1210) performs the operation of encoding and decoding of the UL and DL grant messages for communication with the BS (502). The encoder/decoder (1210) may be configured to search the PDCCH data on CCE indexes by unmasking the RNTI value for the selected AL across the selected search space set received from the PDCCH decoding controller (1212), and further store PDCCH bits in a PDCCH buffer to determine a PDCCH format and a DCI format, and detect the PDCCH data based on the PDCCH format and the DCI format.

The embodiments disclosed herein may be implemented using at least one hardware device and performing network management functions to control the elements in the hardware device.

It shall be noted that although a single BS and single UE are illustrated and explained in the disclosure but a person skilled in the art would appreciate the fact that more than one BS and more than one UE may also be present in the wireless communication system without deviating from the scope of the disclosure.

Figure 13:
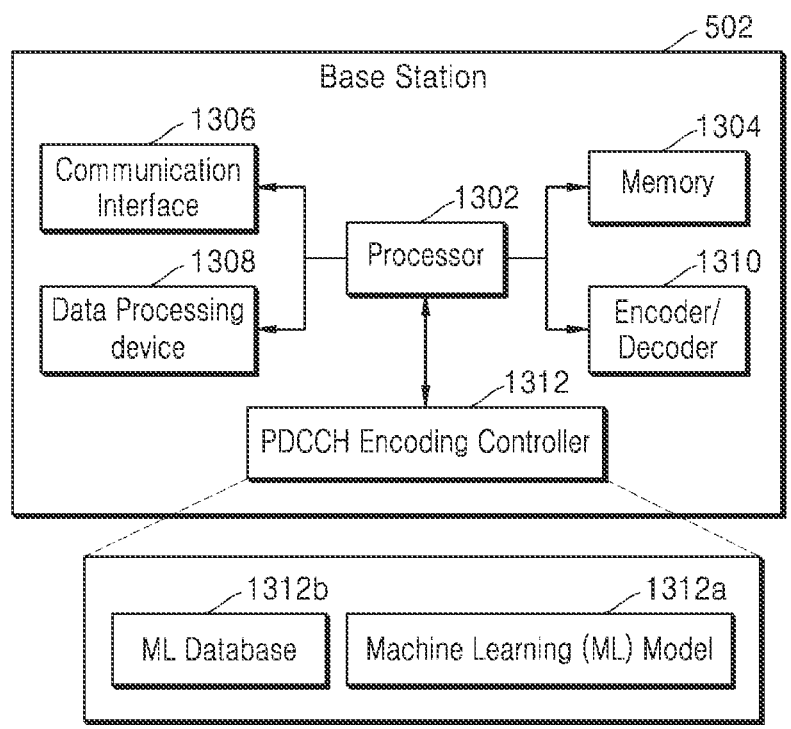
FIG. 13 is a block diagram illustrating an example configuration of the BS for intelligently encoding the PDCCH data received from the BS, according to various embodiments.

FIG. 13 is a block diagram illustrating an example configuration of the BS (504) for intelligently encoding the PDCCH data to be sent to the UE (504), according to various embodiments.

The BS (502) comprises a processor (e.g., including processing circuitry) (1302), a memory (1304), and a PDCCH encoding controller (e.g., including various processing and/or control circuitry) (1312). The BS (502) may comprise a communication interface (e.g., including communication circuitry) (1306), a data processing device (e.g., including data processing circuitry) (1308), and an encoder/decoder (1310). The PDCCH encoding controller (1312) may include a ML database (1312b) and an ML model (1312a). The ML model (1312a) is an example of the NN (506) and the RL models (700, 900). The components of the BS (502) provided herein may not be exhaustive and that the BS (502) may include more or fewer components than that of depicted in FIG. 13. Further, two or more components may be embodied in one single component, and/or one component may be configured using multiple sub-components to achieve the desired functionalities. Some components of the BS (502) may be configured using hardware elements, firmware elements and/or a combination thereof.

The processor (1302) may be coupled with the memory (1304), the communication interface (1306), the data processing device (1308), the encoder/decoder (1310), and the PDCCH decoding controller (1312). The processor (1302) may include various processing circuitry and is configured to execute instructions stored in the memory (1304) and to perform various processes. The communication interface (1306) may include various communication circuitry and is configured for communicating internally between internal hardware components and with external devices via one or more networks. The processor (1302) may include one or more processing units (e.g., in a multi-core configuration).

The memory (1304) stores instructions to be executed by the processor (1302). The memory (1304) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1304) may, in some examples, be considered a non-transitory storage medium. The term "non-transitory" may indicate that the storage medium is not embodied in a carrier wave or a propagated signal. However, the term "non-transitory" should not be interpreted that the memory (1304) is non-movable. In certain examples, a non-transitory storage medium may store data that can, over time, change (e.g., in Random Access Memory (RAM) or cache).

In an embodiment, the processor (1302) is configured to predict, using the PDCCH encoding controller (1312), one or more ALs in 4G wireless communication system, one or more ALs across one or more search space sets in 5G wireless communication network based on the plurality of network parameters using ML model (1312a). The processor (1302) is further configured to receive, with the help of the communication interface (1306), the plurality of network parameters. The processor (1302) is further configured to extract, with the help of the data processing device (1308), required network parameters from the plurality of network parameters using filtering. The data processing device (1308) performs functions such as modulation, filtering, noise cancellation to extract useful data from the received input data at the BS (502). Upon extracting the plurality of network parameters, the processor (1302) is configured to apply the ML model (1312a) to predict one or more ALs and/or one or more search space sets based on the priority. The ML model (1212a) is the trained NN (506) or the RL model (700, 900). The PDCCH encoding controller (1312) is configured to predict the one or more ALs and/or the one or more search space sets and further configured to store the predicted one or more ALs and/or the one or more search space sets in the ML database (1312b). The PDCCH encoding controller (1312) is configured to predict the one or more ALs and/or the one or more search space sets which should be used for PDCCH data transmission using the ML model (1212a) based on inputting the plurality of network parameters, if the ML model (1212a) is the trained NN (506) then the PDCCH encoding controller is configured to determine an optimal weight of each NN node based on a training algorithm, and optimizing the NN (506) based on the optimal weight of each NN node of the plurality of NN nodes, and the plurality of network parameters. The optimal weight corresponds to a weight corresponding to which the error function of the NN (506) is less than the threshold value. The training algorithm is the belief propagation, the back-propagation, or the adaptive learning optimization (Adam). In case the ML model (1312a) is the RL model (700, 900) the PDCCH encoding (1312) controller is configured to determine an optimum policy and state value function for which the error function of the output is less than the threshold error value. The PDCCH encoding controller (1312) is further configured to update the policy and state value function based on rewards received from the action performed by the RL agent (704).

The PDCCH encoding controller (1312) is configured to predict the one or more ALs and/or the one or more search space sets based on priority such as the first priority AL, the second priority AL, the first priority search space set or the second priority search space set. The priority assigned to different ALs generated as output are based on probability of the respective AL being used for PDCCH data transmission by the BS (502) for best possible results. The PDCCH encoding controller is further configured to send the predicted ALs and/or the search space sets to the encoder/decoder (1310).

The encoder/decoder (1310) performs the operation of encoding and decoding of the UL and DL grant messages for communication with the BS (502). The encoder/decoder (1310) is configured to encode the PDCCH data on CCE indexes by masking the RNTI value for the selected AL across the selected search space set received from the PDCCH encoding controller (1312). The encoder/decoder (1310) is configured to encode the PDCCH data by applying appropriate PDCCH format and DCI format.

Figure 14:
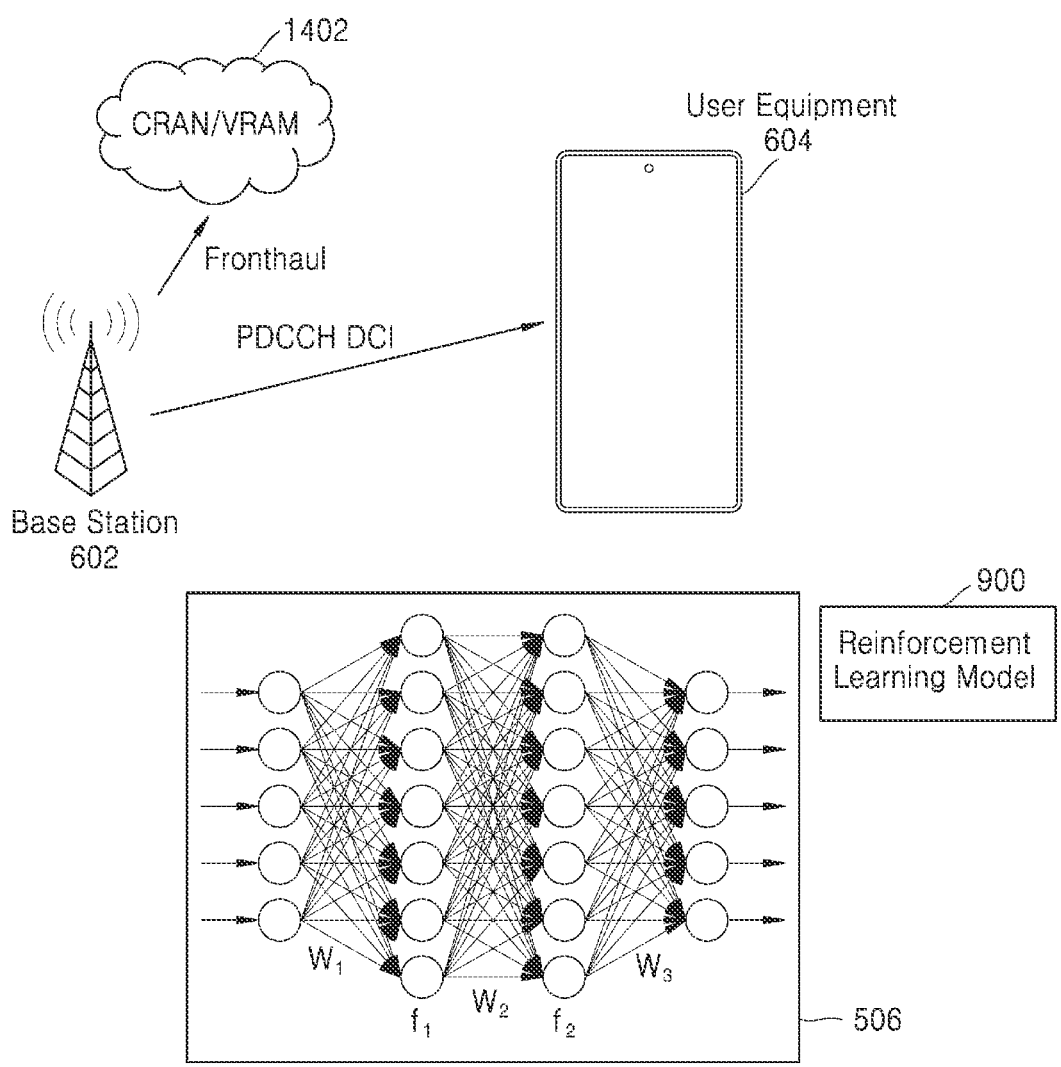
FIG. 14 is a diagram illustrating an example use case scenario of the NN based PDCCH data management in a virtual RAN in the wireless network system, according to various embodiments.
Figure 15:
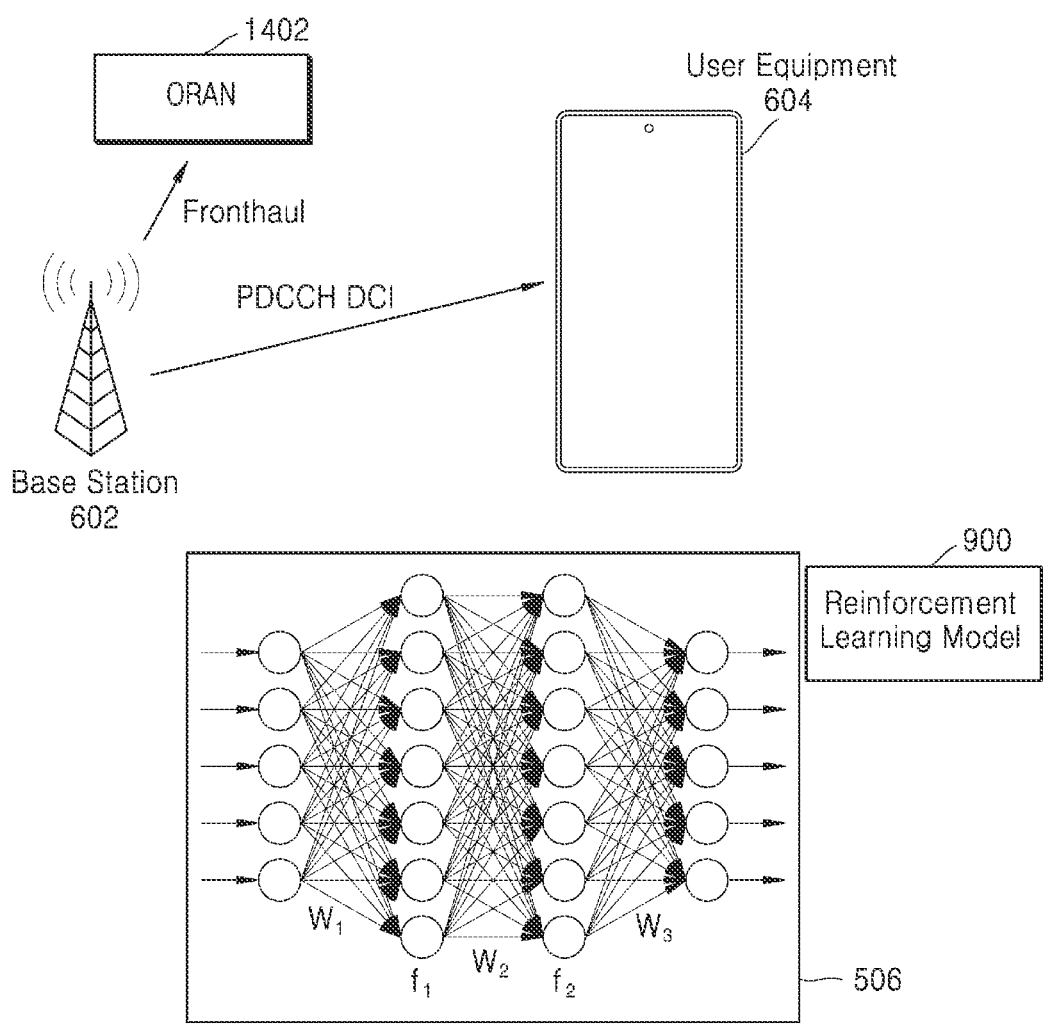
FIG. 15 is a diagram illustrating an example use case scenario of the RL based PDCCH data management in the open RAN in the wireless network system, according to various embodiments.

The implementation of the ML model using NN (506) and the RL model (900) may be done in different available radio access network (RAN_architectures such as virtual RAN (VRAN) architecture (may also be referred as "cloud RAN"), open RAN (ORAN), and the centralized RAN (CRAN). The examples of implementation of the ML model using NN (506) and the RL model (900) in CRAN/VRAN and ORAN is illustrated in FIGS. 14 and 15 respectively.

In a conventional architecture of the VRAN (1402), the core functions of the core network are collocated with the cloud. The ML model is implemented in the cloud to predict the one or more ALs and/or one or more search space sets appropriate for encoding of the PDCCH data.

Similarly, in the ORAN architecture ML model is configured inside a RAN Intelligent Controller (RIC) non-Real Time (non-RT) unit of the ORAN to intelligently predicts the one or more ALs and/or the one or more search space sets using the plurality of network parameters. Using the information related to the predicted one or more ALs and/or the one or more search space sets, the MAC layer may give grants to the UE (504).

According to an example embodiment of the disclosure, a method of operating a user equipment (UE) in a wireless network for managing physical downlink control channel (PDCCH) data includes: obtaining a plurality of network parameters, predicting at least one aggregation level (AL) used by a base station (BS) associated with the UE to transmit the PDCCH data in the wireless network based on the plurality of received network parameters, and decoding the PDCCH data based on the at least one predicted AL.

According to an example embodiment of the disclosure, a method of operating a base station (BS) in a wireless communication network for managing physical downlink control channel (PDCCH) data includes: obtaining a plurality of network parameters, predicting an aggregation level (AL) to be used for transmission of the PDCCH data to a user equipment (UE) in the wireless network based on the plurality of received network parameters, encoding the PDCCH data based on the at least one predicted AL, and transmitting the encoded PDCCH data to the UE.

According to an example embodiment of the disclosure, a user equipment (UE) configured to manage physical downlink control channel (PDCCH) data in a wireless network includes: a memory, a processor, and a PDCCH decoding controller, communicatively connected to the memory and the processor configured to: obtain a plurality of network parameters, predict an aggregation level (AL) used by a base station (BS) associated with the UE to transmit the PDCCH data in the wireless network, and decode the PDCCH data based on the at least one predicted AL.

According to an example embodiment of the disclosure, a base station (BS) configured to manage physical downlink control channel (PDCCH) data in a wireless network includes: a memory, a processor, and a PDCCH encoding controller communicatively connected to the memory and the processor configured to: obtain a plurality of network parameters, predict an aggregation level (AL) to be used for transmission of the PDCCH data to a user equipment (UE) in the wireless network, based on the plurality of received network parameters, encode the PDDCH data based on the at least one predicted AL, and transmit the encoded PDCCH data to the UE.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of operating a user equipment (UE) in a wireless network for managing physical downlink control channel (PDCCH) data, the method comprising:
    obtaining a plurality of network parameters;
    before searching for a PDCCH candidate, predicting at least one aggregation level (AL) used by a base station (BS) associated with the UE to transmit the PDCCH data in the wireless network based on the plurality of obtained network parameters; and
    decoding the PDCCH data based on the at least one predicted AL.

2. The method as claimed in claim 1, wherein the predicting of the at least one AL based on the plurality of network parameters comprises:
    providing the plurality of network parameters as an input to a trained machine learning (ML) model, and
    obtaining the at least one predicted AL as output from the ML model.

3. The method as claimed in claim 2, wherein the ML model includes a neural network (NN) associated with the BS trained using a dataset including a plurality of network parameters and a corresponding AL used by the BS to transmit PDCCH data.

4. The method as claimed in claim 2, wherein the method comprises:
    receiving a decoding feedback using the at least one predicted AL; and
    updating the ML model based on the received decoding feedback.

5. The method as claimed in claim 1, wherein the decoding of the PDCCH data based on the at least one predicted AL comprises:
    searching a PDCCH candidate for the at least one predicted AL; and
    detecting the PDCCH data from the searched PDCCH candidate based on the searched PDCCH candidate passing a cyclic redundancy check (CRC).

6. The method as claimed in claim 1, wherein the decoding of the PDCCH data based on the at least one predicted AL comprises:
    selecting an AL from the at least one predicted AL;
    searching a PDCCH candidate for the selected AL; and
    detecting the PDCCH data from the searched PDCCH candidate based on the searched PDCCH candidate passing a cyclic redundancy check (CRC).

7. The method as claimed in claim 1, wherein the plurality of network parameters comprises at least one of current channel conditions, a hybrid automatic repeat request (H-ARQ) feedback, and a downlink control information (DCI) grant size.

8. The method as claimed in claim 1, wherein the PDCCH data is decoded using a greedy mechanism, wherein the greedy mechanism is configured to:
  start searching PDCCH candidates in the at least one predicted AL, and
  upon finding a PDCCH payload, stop the searching and not proceed with searching remaining PDCCH candidates in the at least one predicted AL.

9. The method as claimed in claim 1, wherein the method further comprises:
  predicting at least one search space set to be monitored for the PDCCH data based on the plurality of obtained network parameters; and
  decoding the PDCCH data based on the at least one predicted search space set.

10. A method of operating a base station (BS) in a wireless communication network for managing physical downlink control channel (PDCCH) data, the method comprising:
  obtaining a plurality of network parameters;
  predicting an aggregation level (AL) to be used for transmission of the PDCCH data to a user equipment (UE) in the wireless network based on the plurality of network parameters by at least:
    providing the plurality of network parameters as an input to a trained machine learning (ML) model, and
    obtaining the at least one predicted AL as output from the ML model;
  encoding the PDCCH data based on the at least one predicted AL; and
  transmitting the encoded PDCCH data to the UE.

11. The method as claimed in claim 10, wherein the plurality of network parameters comprises at least one of current channel conditions, a hybrid automatic repeat request (H-ARQ) feedback, or a downlink control information (DCI) grant size.

12. The method as claimed in claim 10, wherein the ML model includes a neural network (NN) associated with the BS trained using a dataset including a plurality of network parameters and a corresponding AL used by the BS to transmit PDCCH data.

13. A user equipment (UE) configured to manage physical downlink control channel (PDCCH) data in a wireless network, the UE comprising:
  a memory;
  a processor comprising processor circuitry; and
  a PDCCH decoding controller comprising processing circuitry, communicatively connected to the memory and the processor, configured to:
    obtain a plurality of network parameters,
    before searching for a PDCCH candidate, predict an aggregation level (AL) used by a base station (BS) associated with the UE to transmit the PDCCH data in the wireless network based on the plurality of obtained network parameters, and
    decode the PDCCH data based on the at least one predicted AL.

14. A base station (BS) configured to manage physical downlink control channel (PDCCH) data in a wireless network, the BS comprising:
  a memory;
  a processor comprising processor circuitry; and
  a PDCCH encoding controller comprising processing circuitry, communicatively connected to the memory and the processor, configured to:
    obtain a plurality of network parameters,
    predict an aggregation level (AL) to be used for transmission of the PDCCH data to a user equipment (UE) in the wireless network, based on the plurality of network parameters, by at least:
      providing the plurality of network parameters as an input to a trained machine learning (ML) model, and
      obtaining the at least one predicted AL as output from the ML model,
    encode the PDDCH data based on the at least one predicted AL, and
    transmit the encoded PDCCH data to the UE.

15. The user equipment (UE) as claimed in claim 13, wherein the PDCCH encoding controller is further configured to predict the at least one AL based on the plurality of network parameters by:
  providing the plurality of network parameters as an input to a trained machine learning (ML) model, and
  obtaining the at least one predicted AL as output from the ML model.

* * * * *